United States Patent [19]
Haddock et al.

[11] Patent Number: 5,812,792
[45] Date of Patent: Sep. 22, 1998

[54] USE OF VIDEO DRAM FOR MEMORY STORAGE IN A LOCAL AREA NETWORK PORT OF A SWITCHING HUB

[75] Inventors: Stephen R. Haddock, Los Gatos; Michael J. Harwood; Herb O. Schneider, both of San Jose, all of Calif.

[73] Assignee: Network Peripherals, Inc., Milpitas, Calif.

[21] Appl. No.: 606,555

[22] Filed: Feb. 26, 1996

Related U.S. Application Data

[63] Continuation of Ser. No. 279,092, Jul. 22, 1994, abandoned.

[51] Int. Cl.$^6$ .............................. G06F 5/00; G06F 13/00
[52] U.S. Cl. ............................ 395/200.79; 395/200.3; 395/200.43; 395/200.48; 395/200.61; 395/200.64; 395/872
[58] Field of Search ................ 395/200.79, 200.3, 395/200.43, 200.48, 200.61, 200.64, 872

[56] References Cited

U.S. PATENT DOCUMENTS

| | | | |
|---|---|---|---|
| 4,607,345 | 8/1986 | Mehta | 364/900 |
| 4,685,101 | 8/1987 | Segal et al. | 370/84 |
| 4,748,617 | 5/1988 | Drewlo | 370/85 |
| 5,121,390 | 6/1992 | Farrell et al. | 370/94.1 |
| 5,151,997 | 9/1992 | Bailey et al. | 395/800 |
| 5,155,807 | 10/1992 | Blevins et al. | 395/200 |
| 5,163,131 | 11/1992 | Row et al. | 395/200 |
| 5,179,555 | 1/1993 | Videlock et al. | 370/85.13 |
| 5,243,699 | 9/1993 | Nickolls et al. | 395/275 |
| 5,247,620 | 9/1993 | Fukuzawa et al. | 395/325 |
| 5,274,631 | 12/1993 | Bhardwaj | 370/60 |
| 5,289,584 | 2/1994 | Thome et al. | 395/325 |
| 5,371,607 | 12/1994 | Nannina et al. | 358/402 |
| 5,428,754 | 6/1995 | Baldwin | 395/375 |
| 5,469,545 | 11/1995 | Vanbuskirk et al. | 395/200.01 |
| 5,473,756 | 12/1995 | Traylor | 395/250 |
| 5,630,091 | 5/1997 | Lin et al. | 395/437 |

OTHER PUBLICATIONS

"A Standard for the Transmission of IP Datagrams over IEEE 802 Networks", Request For Comments (RFC) 1042, Feb., 1988.

"Transmission of IP and ARP over FDDI Networks", RFC 1390, Jan., 1993.

*Primary Examiner*—Ayaz R. Sheikh
*Assistant Examiner*—Valerie Darbe
*Attorney, Agent, or Firm*—Crosby, Heafey, Roach & May; Philip M. Shaw, Jr.

[57] ABSTRACT

A plurality of video dynamic random access memory devices (VRAMs) distributed among low speed local area network ports of a distributed memory switching hub interconnecting heterogeneous local area networks operating at different transmission speeds for receiving, storing and forwarding frames of data. The distributed memory switching hub employs a distributed memory architecture in which VRAM devices located at each low speed LAN port of the distributed memory switching hub store frames of data received or to be forwarded. The VRAM device is comprised of serial access memory (SAM) coupled to and transmitting frames of data with a high speed internal data bus at the same speed of the data bus and dynamic random access memory (RAM) coupled to and transmitting frames of data with a low speed local area network at the same speed of the low speed local area network. The SAM and RAM operate asynchronously with respect to each other to provide simultaneous bidirectional transfer of frames of data between them.

12 Claims, 15 Drawing Sheets

USE OF VIDEO DRAM FOR MEMORY STORAGE IN A LOCAL AREA NETWORK PORT OF A SWITCHING HUB

This is a continuation of application Ser. No. 08/279,092, filed Jul. 22, 1994, now abandoned.

TABLE OF CONTENTS
I. BACKGROUND OF THE INVENTION
  A. Field of the Invention
  B. Description of the Related Art
II. SUMMARY OF THE DISCLOSURE
III. BRIEF DESCRIPTION OF THE DRAWINGS
IV. DETAILED DESCRIPTION OF THE EMBODIMENTS OF THE INVENTION
  A. Nomenclature and Conventions
  B. Overview
  C. Detailed Functional Description
  1. CSMA/CD LAN to FDDI Ring Data Flow
  2. FDDI Ring to CSMA/CD LAN Data Flow
  3. CSMA/CD LAN Port Operation
    a. Functional Overview
    b. CSMA/CD LAN Port Buffer Management
    c. Multicast Frames Transmission Rate Logic
  4. Translation Engine
    a. Guidelines for Frame Format Translation
    b. Operation of Translation Engine
  5. Operation of Address Filter Engine, CAM and Bus Arbiter
V. CLAIMS
VI. ABSTRACT OF THE DISCLOSURE

BACKGROUND OF THE INVENTION

A. Field of the Invention

The present invention relates to the field of local area network (LAN) hubs. Specifically, the present invention relates to an distributed memory switching hub that connects heterogeneous LANs.

B. Description of the Related Art

Client/server computing architecture provides for a large number of clients, i.e., desktop computing devices such as PCs, distributed across an enterprise to be connected in a data network in order to share information and resources located at one or more locations within the enterprise. The information and resources are generally located within or maintained by high performance computer systems called servers and may comprise application software, databases, high speed peripherals or large mass storage devices. Client/server computing architecture has traditionally been based on local area network (LAN) technology such as 10 Mb/s Ethernet or, more generally, a 10 Mb/s bus employing the well known carrier sense, multiple access bus with collision detection (CSMA/CD) to transmit data.

Over the past decade, the number of devices, or "end stations" connected to CSMA/CD LANs and the amount of information transferred between such end stations has grown rapidly. The growth has led to congestion affecting the performance of such LANs. Congestion can be overcome to some degree by partitioning a LAN into multiple segments via bridges or routers. While providing access to the entire data network, these devices electrically isolate the separate segments, thereby reducing the congestion and collisions that can occur when multiple end stations attempt to transmit data at the same time onto the same LAN segment. Bridges and routers have additional capabilities which allow them to properly discard frames of data that would otherwise be unnecessarily transmitted across LAN segments to which they are connected, thereby further reducing unnecessary traffic over the interconnected LAN segments. However, the overall transmission speed of the enterprise-wide data network is still limited to the speed of the underlying LAN technology employed. Furthermore, the presence of bridges and routers, while reducing unnecessary traffic, introduce yet another source of congestion due to the processing overhead incurred as frames of data traverse bridges and routers within the internetwork.

The relatively slow transmission speed of a CSMA/CD LAN, the bridge or router processing overhead encountered as information traverses the data network, and the increasing use of imaging, distributed database management, multimedia or other data-intensive software applications all contribute to an increasingly congested data network. CSMA/CD LAN switching is another approach to reducing network congestion between multiple LAN segments. When a client sends information to a server in another LAN segment, the CSMA/CD LAN switch determines the proper segment to which the information is destined and forms a connection between the appropriate segments. While reducing data network congestion, this approach is also limited to the 10 Mb/s transmission speed of a CSMA/CD LAN. Thus, the inability of existing technology to satisfactorily resolve problems encountered due to greater volumes of traffic on the today's data networks has prompted the development and use of higher speed LAN technologies such as 100 Mb/s Fiber Distributed Data Interface (FDDI), Fast Ethernet, also 100 Mb/s, and Asynchronous Transfer Mode (ATM), which allows speeds from 155 Mb/s up to 622 Mb/s.

Relative to CSMA/CD LAN technology, higher speed LAN technologies, for example, FDDI, are expensive to implement at every desktop. Furthermore, migrating every existing end station in a CSMA/CD LAN to a FDDI ring precludes leveraging investments in CSMA/CD LAN technology and equipment such as software, drivers, adapters, hubs and bridges. Additionally, given the present requirements of client/server applications, it is not necessary to provide 100 Mb/s or greater transmission speeds to every end station in the data network. A client, which requires low cost connectivity to the data network, typically communicates with only one server, and needs a quick response to requests sent to the server. On the other hand, a server needs to respond quickly to requests from a potentially large number of clients while at the same time managing information and resources. Thus, servers can benefit greatly from the increased bandwidth achieved by migrating to a high speed LAN environment, such as FDDI, while clients might see only an incremental benefit in their performance. By migrating to a FDDI ring only those end station s, e.g., servers, requiring such transmission speed, a substantial increase in the performance of a data network can be achieved, while at the same time, substantial savings can be realized.

As has been indicated above, FDDI and CSMA/CD LANs are different LAN technologies in at least certain respects. For example, a FDDI ring supports 100 Mb/s transmission speed, while a CSMA/CD bus supports 10 Mb/s transmission speed. Additional differences, such as, but not limited to, the method of accessing and transmitting data on the medium, frame formats, and frame lengths exist. It is not possible for a client operating in a CSMA/CD LAN environment to directly communicate with a server that has been migrated to a FDDI environment. A hub comprising one or more FDDI and CSMA/CD LAN ports may be used so that CSMA/CD LAN-based end stations can communicate with FDDI-based end stations, thereby increasing the performance of the data network without abandoning existing investments in CSMA/CD LAN technology at the desktop.

FIG. 1 provides a diagram of a typical enterprise-wide data network topology including an embodiment of distributed memory switching hub 18 interconnecting FDDI ring 16 to one or more CSMA/CD LAN segments 12. Although FIG. 1 includes a FDDI ring, an embodiment of distributed memory switching hub 18 could interconnect one or more CSMA/CD LAN segments 12 to any high speed network, for example, Fast Ethernet or ATM. Multiple CSMA/CD LAN segments 12 may be coupled to a single 10base-T hub 17, although FIG. 1 shows only one CSMA/CD LAN segment 12 coupled to a 10Base-T hub 17. 10Base-T hub 17, in turn provides a connection between a CSMA/CD LAN port 11 on distributed memory switching hub 18 and the attached CSMA/CD LAN segments 12 via segment 21, itself a CSMA/CD LAN. Distributed memory switching hub 18 functions as a CSMA/CD LAN switch, as described above. Additionally, distributed memory switching hub 18 has one FDDI port 19 through which it is coupled by fiber optic cable 20 or UTP wiring to FDDI concentrator 15. FDDI concentrator 15 can act as a collapsed FDDI ring ("collapsed backbone") or provide a connection to physical FDDI ring 16. In alternative embodiments, multiple FDDI ports may be utilized. FDDI concentrator 15, in turn, provides a connection to a number of servers 14 that are each configured with an appropriate FDDI adapter and software driver. Distributed memory switching hub 18 provides a connection between FDDI concentrator 15 and its associated servers 14 and 10Base-T hubs 17, their associated CSMA/CD LAN segments 12 and attached clients 10. Thus, distributed memory switching hub 18 allows both FDDI and CSMA/CD LAN technologies to coexist in an enterprise-wide data network, thereby enhancing the performance of the client/server computing paradigm.

A switching hub is a computer system including software optimized to receive and transmit frames of data between LAN segments. Referring to FIG. 2, as an optimized computer system, prior art switching hub 35 is generally comprised of the same components as a general purpose computer system, including a central programmable processor 30, an internal control and data bus 33 and shared common memory 31 controlled by central programmable processor 30. Additionally, prior art switching hub 35 has a plurality of low speed media access controllers (MACS) 34, each having an associated LAN port 36 coupled to, for example, a CSMA/CD bus 38. Recent switching hubs interconnect heterogeneous local area networks operating at different transmission speeds, and thus, may also include one or more high speed MACs 32 each having an associated LAN port 37 coupled to, for example, a FDDI ring 39.

A switching hub architecture based on a central programmable processor and shared common memory has numerous drawbacks. First, when a frame of data is received, LAN port 36 at which it is received needs to gain access to shared common memory 31 to fully store the frame because its associated low speed MAC 34 provides little or no buffering capacity at LAN port 36. If LAN port 36 is not able to gain access to shared common memory 31, for example, because multiple LAN ports are simultaneously attempting to access shared common memory 31, LAN port 36 may enter blocking mode, discarding the frame of data. Thus, high speed memory prevents LAN port 36 from entering blocking mode and discarding a frame. Second, such an architecture does not scale well because memory bandwidth needs to be increased to accommodate any additional LAN ports. Third, when a frame of data is simultaneously multicast or broadcast out all LAN ports, as many copies as there are LAN ports need to be generated and queued for transmission, since each LAN port 36 has an associated transmit queue in shared common memory 31. The overhead and inefficiency of this operation in terms of memory space usage and internal bus 33 traffic is obvious. Fourth, if it is determined that a frame of data already received and stored in shared common memory 31 is to be discarded, for example, due to an address compare mismatch, central programmable processor 30 needs to access shared common memory 31 to flush the frame or mark it as invalid. Finally, in prior art switching hubs, the maximum frame forwarding rate is limited because central programmable processor 30 and shared common memory 31 are both involved in receiving, storing and forwarding each frame of data.

As will be seen, the present invention overcomes the above mentioned drawbacks inherent in a switching hub architecture comprising a central programmable processor 30 and shared common memory 31.

The most recent generation of switching hubs receive and transmit frames of data between heterogeneous LAN segments, e.g., 100 Mb/s FDDI, 16 Mb/s Token Ring, and 10 Mb/s CSMA/CD Bus. Switching hubs that interconnect heterogeneous LANs need to account for, among other things, the different transmission speeds at which such LANs operate. In prior art switching hubs, a circuit comprising shared memory stores frames of data, while another, entirely separate circuit adapts for the different rates at which such frames are transmitted. Each circuit typically contains multiple physical devices. A significant simplification in circuitry and concomitant reduction in cost can be achieved by combining the circuitry for storing frames of data with the circuitry for adapting between dissimilar LANs operating at different transmission speeds. The present invention provides this simplification in circuitry.

Switching hubs that interconnect heterogeneous LANs need to also account for the different data encapsulation or frame formats adhered to by different local area network architecture. The switching hub needs to translate frames of data to the proper frame format used by the destination LAN when forwarding them to that LAN. Such translation may require manipulating a frame of data by removing or deleting particular fields within the frame, inserting fields, and swapping the bit-order sequence of yet other fields. A common method of translating frame formats in prior art switching hubs is to receive and store a complete frame of data in a scratchpad area of shared memory where fields are deleted, inserted, or otherwise manipulated by a central programmable processor. Translating the frame typically involves moving blocks of data representing various fields of the frame around in the scratchpad area of memory to provide space for adding new fields or remove space representing fields that have been deleted. Translating frames in this manner may require asynchronous memory and special circuitry capable of gathering and concatenating the output data stream from non contiguous locations within the scratchpad area of shared memory, if the switching hub is to maintain a constant flow of data. Thus, the process involves complex circuitry and significant processing overhead that negatively impacts the switching hub's throughput (measured in frames per second). As will be described, the present invention does not require a central programmable processor or shared common memory resources to translate frames for transmission between heterogeneous interconnected LANs.

Yet another issue that arises when interconnecting heterogeneous local area networks operating at different transmission speeds is broadcast or multicast storms. Broadcast or multicast storms among homogenous interconnected LANs are well known to those of ordinary skill in the art. The problem can become even more severe when interconnecting heterogeneous LANs operating at different transmission speeds because of the ease with which a LAN operating at a relatively faster transmission speed, e.g., FDDI or ATM, can flood one or more LANs operating at a lower transmission speed, e.g., CSMA/CD bus or token ring, with large numbers of broadcast or multicast frames. Prior art MAC layer devices such as bridges or switching hubs have the ability to filter, i.e., to block, specific broadcast or multicast frames from being forwarded from one LAN to another LAN. The present invention replaces this limited all or nothing approach with a more flexible solution in which multicast and broadcast frames are transmitted at a maximum rate that can be individually tuned for each interconnected low speed local area network. Furthermore, prior art switching hubs utilize software executed by a central programmable processor to perform frame filtering and, as such, compete with other functions performed by the switching hub, causing performance degradation of the entire hub when broadcast or multicast storms occur.

Rather than a fixed central bus architecture, a prior art switching hub could employ a cross point switch architecture. A switching hub employing a cross point switch architecture provides dynamic connections between local area networks based on the destination MAC address of a frame received at a LAN port on the hub. Referring to FIG. 3, cross point switching hub 40 is comprised of a cross point switch 44, a plurality of media access controllers (MACs) 43, each having a LAN port 48 coupled to a local area network 47. Each MAC 43 is further coupled to address filter 41 by way of a request line 42. Address filter 41 learns and maintains a list of MAC addresses and the LAN port 48 over which the end station to which the MAC address belongs is located. It also maintains state information about the current state of each MAC 43 and any dynamic links 45 between it and another MAC 43. Address filter 41 is coupled via switch control lines 46 to cross point switch 44. Dynamic links 45 between MACs 43 are controlled by address filter 41. Address filter 41 "throws a switch", that is, it sends a signal to cross point switch 44 over switch control lines 46, dynamically linking two or more MACs when a frame needs to be forwarded between the MACs.

The basic operation of prior art switching hub 40 is as follows. When a frame of data is received at a LAN port 48, the associated MAC 43 informs address filter 41 of the destination MAC address contained therein via request line 42. Address filter 41 determines from its list of MAC addresses the LAN port number of the LAN port 48 associated with the MAC 43 out which the frame should be transmitted. Address filter 41 sends a signal over switch control lines 46 to cross point switch 44 instructing it to form a dynamic link 45 between source MAC 43 and destination MAC 43. Source MAC 43 then transfers the frame over dynamic link 45 to destination MAC 43. After the frame of data is transferred, Address filter 41 sends another signal to cross point switch 44 to remove dynamic link 45 between source MAC 43 and destination MAC 43. The cross point switch architecture is very fast in terms of frame forwarding rates because of the low latency in establishing a dynamic link and immediate transmission of frames of data between MACs. When a dynamic link is formed between a first LAN port and a second LAN port, other LAN ports are unable to link to either the first or the second LAN port, and thus, may discard frames.

A disadvantage of prior art switching hub 40 arises when a dynamic link is formed between any two MACs 43 that do not provide for any buffering of frames of data. As a result, each local area network to which LAN port 48 of each MAC 43 is coupled needs to operate at the same transmission speed. Thus, prior art switching hub 40 can not interconnect heterogeneous LANs operating at different transmission speeds.

Prior art switching hub 40 shares another disadvantage found in prior art switching hub 35 of FIG. 2. In order to send a broadcast frame, a MAC 43 needs to form a dynamic link 45 between every other MAC 43. If, however, other dynamic links currently exist between other MACs, MAC 43 will either enter blocking mode and discard any frames received until such time as a dynamic link is formed and the broadcast frame transferred, or establish a separate, additional dynamic link for transmission of broadcast or multicast frames. The latter alternative requires circuitry necessary to support multiple dynamic links between any two MACs 43.

A similar problem can occur when a first MAC 43 attempts to transfer a frame of data to a second MAC 43 that already has a dynamic link established with a third MAC 43 and is transferring large amounts of data between itself and third MAC 43. First MAC 43 will wait until the dynamic link between second and third MACs 43 is removed before establishing a dynamic link of its own with second MAC 43 and transferring data. While first MAC 43 waits for dynamic link establishment, it enters blocking mode and discards any frames received.

As will be seen, the present invention further overcomes the above mentioned drawbacks inherent in a hub architecture comprising a cross point switch.

SUMMARY OF THE DISCLOSURE

A method and apparatus for interconnecting heterogeneous local area networks operating at different transmission speeds and for receiving, storing and forwarding frames of data between the local area networks is described, particularly for an apparatus in which memory storage is distributed among the LAN ports of the apparatus.

An embodiment of the present invention employs distributed memory in which memory storage for frames of data received or to be transmitted is located at each low speed LAN port of a switching hub. By employing memory storage at each low speed LAN port of the switching hub, it is an object of the present invention to provide a nonblocking architecture. Nonblocking architecture overcomes the disadvantage of prior art switching hubs caused when LAN ports, upon receiving a frame of data, simultaneously attempt to access shared common memory, enter blocking mode and discard the frame. Furthermore, a nonblocking architecture overcomes the disadvantage of prior art switching hubs that occurs when multiple copies of broadcast or multicast frames are created and queued in a shared common memory, one for each LAN port, and transmitted in rapid succession, preventing a LAN port from receiving a frame of data during the transmission. In a nonblocking architecture, only one copy of a multicast or broadcast frame is created. Each LAN port copies the same frame into their respective memory storage prior to transmission on to the attached LAN.

It is a further object of the present invention to provide a highly scalable hub architecture by using distributed memory storage at each low speed LAN port. Because no shared common memory is used, the maximum number of low speed LAN ports is limited only by the speed of the internal bus. Although the embodiment of the present invention employs distributed memory storage at each low speed LAN port, it is foreseeable to one of ordinary skill in the art that the distributed memory architecture could be applied to LAN ports of any speed.

It is another object of the present invention to allow a single broadcast frame to be simultaneously copied to all LAN ports of a switching hub for subsequent transmission. This, too, is accomplished by using distributed memory storage at each low speed LAN port.

It is yet another object of the present invention to provide a hardware-based flush mechanism that quickly flushes a frame of data prior to transmission without requiring a central programmable processor to access shared common memory to remove a frame of data or mark it invalid.

By employing distributed memory storage, it is another object of the present invention to allow low speed LAN ports to operate autonomously, that is, without the control of a central programmable processor, in receiving, storing and forwarding frames of data, thereby providing a switching hub that operates at a much higher frame forwarding rate than hubs employing a central programmable processor and shared common memory.

It is an object of the present invention to combine circuitry for storing frames of data and circuitry for adapting transmission speeds between an attached high speed local area network, e.g., 100 Mb/s FDDI or 155 Mb/s ATM, and an attached low speed local area network, e.g., 10 Mb/s CSMA/CD bus, without impeding transmission or reception of frames at the LAN port. The combination of such circuitry is achieved using video DRAM (VRAM) as the memory storage device located at a low speed LAN port to which the low speed LAN segment is coupled.

An additional object of the present invention is to limit the overall rate at which broadcast and multicast frames are transmitted over low speed local area networks interconnected by a MAC layer device such as a switching hub. The ability to limit the rate at which such frames are transmitted prevents broadcast or multicast storms from overwhelming the capacity of the low speed local area networks without having to block or forego transmission of such frames altogether. Furthermore, the present invention employs distributed logic located within each low speed LAN port of a switching hub that allows the rate at which such frames are transmitted to be individually tuned for each attached low speed LAN. Finally, the present invention provides for a burst limit, in which the overall maximum multicast or broadcast frames transmission rate may be exceeded for a finite number of such frames. This burst limit can also be individually tuned for each attached low speed LAN.

It is, finally, an object of the present invention to increase the speed at which frames of data are translated from a first frame format to a second frame format and significantly reduce the complex circuitry and processing overhead involved in translating such frames when forwarding frames between dissimilar LANs. The present invention employs a frame translation mechanism comprised of a variable length data pipeline capable of adding, deleting, or otherwise modifying fields within a frame. The variable length data pipeline maintains a constant synchronous flow of data at the input and output of the data pipeline limited only by the minimal delay induced by the length of the data pipeline.

The aforementioned and further objects, features and advantages of the present invention will be apparent from the description and figures which follow below.

BRIEF DESCRIPTION OF THE DRAWINGS

The present invention is illustrated by way of example and not limitation in the following figures.

DETAILED DESCRIPTION OF THE EMBODIMENTS OF THE INVENTION

A. Nomenclature and Conventions

1. A Data "Frame"

Figure 1:
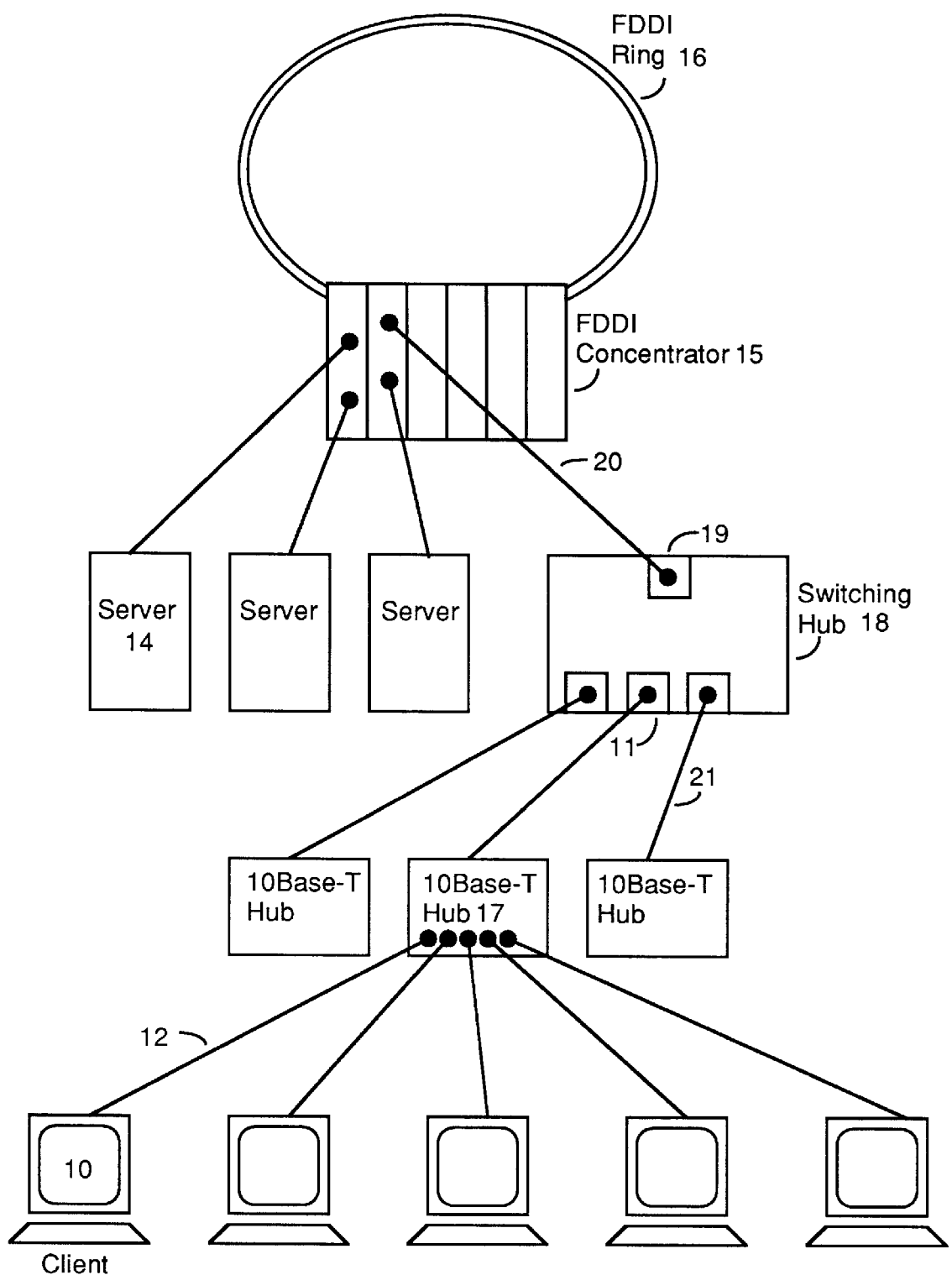
FIG. 1 illustrates a data network topology in which an embodiment of the present invention may be implemented.
Figure 2:
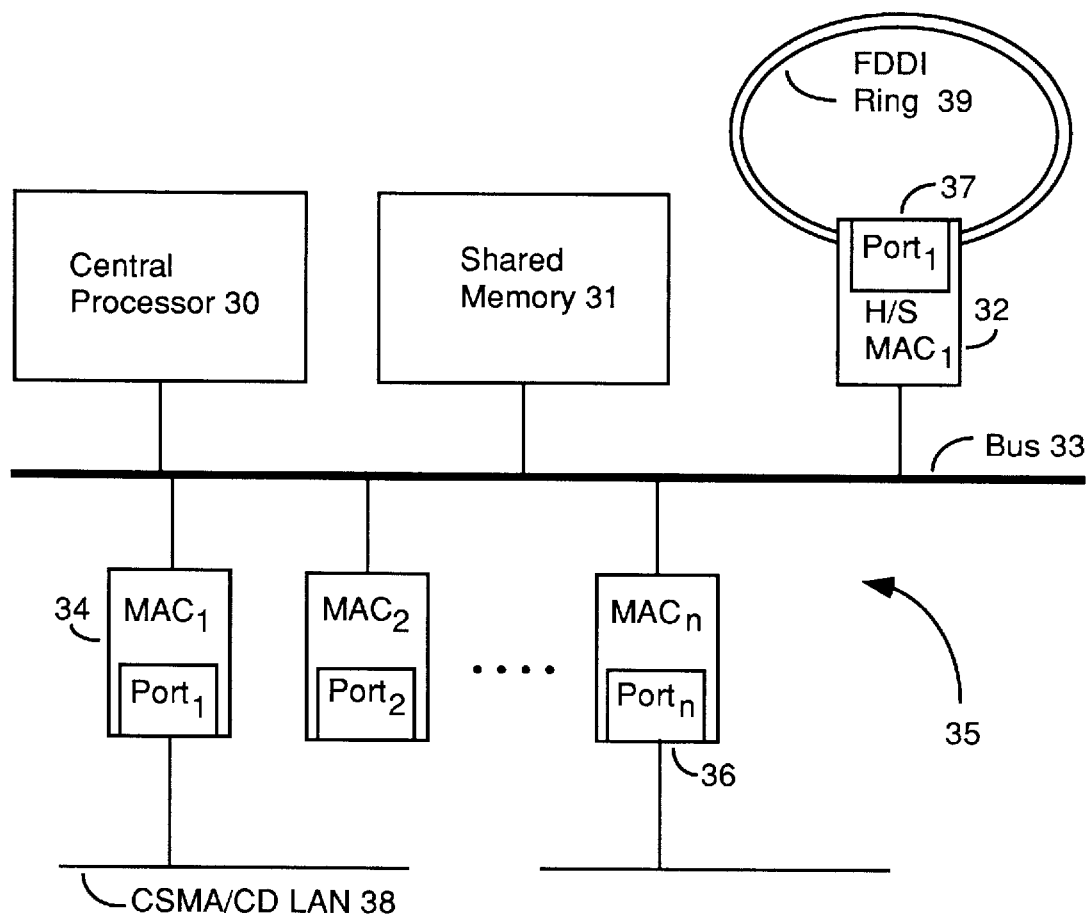
FIG. 2 is a block diagram of a prior art hub employing a central programmable processor and shared common memory.

An embodiment of the distributed memory switching hub disclosed herein is a MAC layer device, that is, it operates at the MAC sublayer of the data link layer of the International Standards Organization (ISO) Open Systems Interconnection (OSI) seven layer abstract reference model. The reference model is comprised of the physical, data link, network, transport, session, presentation, and application layers. The data link layer is tasked with maintaining a reliable communication link between neighboring end stations and providing a reliable delivery mechanism to transmit data between the end stations. In order to provide a reliable delivery mechanism, the data link layer encapsulates or "frames" the data to be transmitted with source and destination media access control (MAC) addresses and error control information in the form of a frame check sequence (FCS) trailer. The FCS is a 32-bit cyclical redundancy check (CRC) based upon the entire contents of the MAC frame. Thus, when discussing transmission of data at the data link layer of the OSI model, one speaks in terms of "frames" of data, or "data frames." Hence the phrase "MAC frame" or simply "frame" is used when discussing transmission of data through distributed memory switching hub 18.

2. CSMA/CD, Ethernet and IEEE Standard 802.3

The term Ethernet LAN, or simply Ethernet, is commonly used by those of ordinary skill in the art to mean a 10 Mb/s local area network architecture employing a carrier sense, multiple access bus with collision detection (CSMA/CD) to transmit data. Used in that manner, the term encompasses both "Ethernet" and the Institute of Electrical and Electronics Engineers (IEEE) standard 802.3 (ISO 8802-3), since both Ethernet and IEEE 802.3 use the carrier sense, multiple access bus with collision detection (CSMA/CD) to transmit data. However, in describing the present invention, the term CSMA/CD LAN, rather than the term Ethernet, is used to indicate a 10 Mb/s local area network architecture employing the carrier sense, multiple access bus with collision detection (CSMA/CD). The terms Ethernet and IEEE 802.3 are used to indicate different particular media access control (MAC) frame formats as discussed below.

Ethernet and IEEE 802.3 media access control (MAC) frame formats differ in that the Ethernet header specifies a protocol type field, whereas the 802.3 MAC header specifies a length field. Additionally, the 802.3 MAC frame has an IEEE 802.2 logical link control (LLC) header following the MAC header and preceding the OSI network layer protocol header, if one exists. Both Ethernet and 802.3 MAC frames can exist on the same CSMA/CD LAN at the same time, although a client having an Ethernet driver loaded cannot transmit or receive 802.3 MAC frames. Likewise, a client having an IEEE 802.3 driver loaded cannot transmit or receive Ethernet frames. So while the distinction between Ethernet and 802.3 MAC frame formats is not important when distinguishing between a CSMA/CD LAN and some other local area network architecture, for example, Token Ring (IEEE 802.5) or FDDI (ANSI X3T9.5), the distinction is important when distinguishing between Ethernet and 802.3 MAC/802.2 LLC frame formats.

Interconnecting heterogeneous local area networks gives rise to additional issues with respect to frame formats. Token ring and FDDI have MAC frame formats which differ from both Ethernet and IEEE 802.3 MAC frame formats. Thus, a frame of data needs to be translated to the proper frame format used by the destination LAN when forwarded between a CSMA/CD LAN and a dissimilar LAN such as a FDDI ring or token ring. The fact that multiple frame formats can exist on a CSMA/CD LAN needs to be recognized by a MAC layer device such as a switching hub when performing this translation. The MAC layer device interconnecting the dissimilar LANs need to be able to distinguish between an Ethernet frame and an 802.3 MAC frame when translating and forwarding a frame of data from a CSMA/CD LAN to a dissimilar LAN. Likewise, when translating and forwarding a frame of data from a token ring or FDDI ring to a CSMA/CD LAN, the MAC layer device needs to decide whether to translate the frame to an Ethernet or 802.3 MAC frame format.

3. Subnetwork Access Protocol (SNAP)

From the perspective of the IEEE, an Ethernet frame format is considered a nonstandard frame format. Thus, in order to transmit an Ethernet frame to a standard IEEE 802.X LAN, either IEEE 802.3—CSMA/CD Bus, 802.4—Token Bus, or 802.5—Token Ring, the Ethernet header within the frame of data needs to be translated to an IEEE 802.X MAC header and a 802.2 logical link control (LLC) header inserted. However, in doing so, the protocol type field in the Ethernet header indicating the type of network layer protocol header following the header is discarded. If the protocol type is not preserved, the destination end station, e.g., server, upon receiving the frame, has no way to determine the upper layer protocol to which the contents of the frame should be passed after stripping the 802.3 MAC and 802.2 LLC headers. Therein lies the purpose of the subnetwork access protocol (SNAP). A SNAP header is an extension to the 802.2 LLC header. The SNAP header includes a two-byte EtherType field so that the protocol type field of an Ethernet frame can be preserved when translating an Ethernet frame into a standard IEEE 802.X frame for transmission onto a standard IEEE 802.X data network. For the purposes of the present invention, FDDI is considered a standard IEEE network, although the X3T9.5 standard for FDDI was developed by the American National Standards Institute (ANSI). Further information regarding translation of Ethernet frames for transmission over FDDI and IEEE 802.X LANs can be found in DDN Network Information Center, *A Standard for the Transmission of IP Datagrams over IEEE 802 Networks*, Request For Comments (RFC) 1042, February, 1988, *Transmission of IP and ARP over FDDI Networks*, RFC 1390, January, 1993, and Institute of Electrical and Electronics Engineers, *Media Access Control For Ethernet V2.0*, P802.1h/D5, January, 1994.

4. Canonical and Noncanonical MAC Layer Addressing

CSMA/CD LANs (Ethernet and IEEE 802.3 LANs) use canonical addressing, in which the least significant bit (LSB) of the most significant byte of the destination and source MAC address fields of a frame is transmitted first. FDDI and token ring LANs use noncanonical addressing, in which the most significant bit (MSB) of the most significant byte of the destination and source MAC address fields is transmitted first. For an end station, e.g., client, on a CSMA/CD LAN to communicate with an end station, e.g., server, on a FDDI or token ring LAN, a MAC layer device providing an interconnection between the dissimilar LANs, for example, an embodiment of the present invention, needs to reverse the bit order sequence of each byte of the source and destination MAC address fields when forwarding the frame. The method and apparatus for performing this function in an embodiment of the present invention is described below.

5. FDDI Frame Control (FC) Field

The FDDI frame control (FC) field defines the type of frame in which it exists. It is comprised of one byte containing four fields in the following sequence: one-bit frame class field (C), one-bit frame address length field (L), two-bit frame format field (F), and four-bit control field (Z). The possible FDDI frame types defined by the frame control field are shown in the Table 1 below:

TABLE 1

| FDDI Frame Control (FC) Field. | | |
|---|---|---|
| C L F F | Z Z Z Z to Z Z Z Z | FDDI Frame Type |
| 0 X 0 0 | 0 0 0 0 | Void frame |
| 1 0 0 0 | 0 0 0 0 | Nonrestricted Token |
| 1 1 0 0 | 0 0 0 0 | Restricted Token |
| 0 L 0 0 | 0 0 0 1 to 1 1 1 1 | Station Management Frame |
| 1 1 0 0 | 0 0 0 1 to 1 1 1 1 | MAC management frame |
| 1 L 0 0 | r 0 0 1 to r 1 1 1 | LLC information frame |

TABLE 1-continued

FDDI Frame Control (FC) Field.

| C L F F | Z Z Z Z to Z Z Z Z | FDDI Frame Type |
|---|---|---|
| C L 1 0 | r 0 0 0 to r 1 1 1 | Reserved for implementor |
| C L 1 1 | r r r r | Reserved for future use | where X is a don't care (either 0 or 1), and r (reserved for future use), is typically set to zero. C=0 indicates an asynchronous frame, whereas C=1 indicates a synchronous frame. L=0 indicates 16-bit destination and source MAC address fields follow. L=1 indicates 48-bit destination and source MAC address fields follow. The frame format field (F) indicates the type of frame. In the case of LLC information frames, the last three bits of the frame control field (Z) indicate the priority of the frame, with "0 0 0" as the lowest asynchronous priority and "1 1 1" as the highest asynchronous priority.

B. Overview

The present invention describes a method and apparatus for interconnecting heterogeneous local area networks operating at different transmission speeds and for receiving, storing and forwarding frames of data between the local area networks (LANs), particularly for an apparatus in which memory storage is distributed among the low speed LAN ports to which LAN segments are attached. In the following detailed description, for purposes of explanation, numerous specific details are set forth describing specific representations of data, specific hardware platforms upon which certain components may be implemented, method steps, etc., in order to provide a thorough understanding of the present invention. However, it will be apparent to one of ordinary skill in the art that these specific details need not be used to practice the present invention. In other instances, well known structures, circuits, interfaces, and processes have not been shown in detail in order not to unnecessarily obscure the present invention.

FIG. 1 shows a diagram of an example enterprise-wide internetwork topology in which an embodiment of the present invention can be employed. The internetwork topology of FIG. 1 is illustrative of, but not limited to, the internetwork environment in which an embodiment of the present invention can be employed. Thus, while FIG. 1 specifically represents switching hub 18 interconnecting high speed FDDI concentrator 15 and FDDI ring 16 to relatively lower speed CSMA/CD LAN segments 12, other high speed LAN technologies such as Fast Ethernet (100 Mb/s Ethernet) or Asynchronous Transfer Mode (ATM) can be employed. However, for the purpose of providing a concise description of the embodiments of the present invention, such embodiments will be described in the context of FDDI as the high speed LAN technology employed. Thus, the diagram of FIG. 1 depicts a client/server computing environment in which clients 10 coupled to CSMA/CD LAN segments 12 communicate with servers 14 coupled to the LAN ports of FDDI concentrator 15. Although not shown in FIG. 1, servers 14 could alternatively be coupled to FDDI ring 16 to which FDDI concentrator 15 is coupled. Furthermore, servers 14 could be coupled to any network segment, including one of CSMA/CD LAN segments 12. Servers 14 have FDDI adapters and necessary software drivers incorporated so that they can be coupled directly to FDDI concentrator 15 or FDDI ring 16. Distributed memory switching hub 18 provides the communications pathway between the dissimilar LANs so that CSMA/CD-based clients 10 can communicate with FDDI-based servers 14. Distributed memory switching hub 18 supports up to twelve 10Base-T LAN ports 11 with RJ-45 8-pin connectors. To each 10Base-T LAN port 11 can be connected either a client 10 or a 10Base-T hub 17 to which clients 10 may be coupled in order to accommodate more than twelve overall clients. The first of twelve 10Base-T LAN ports can alternatively support an attachment unit interface (AUI) for connection to thick coaxial cable (10Base5) or a fiber optic interface for connection to fiber optic cable (10BaseF). FDDI port 19 is coupled to FDDI concentrator 15 via fiber optic cable 20 or other supported cable type. Thus, most data traffic flows from one or more servers 14 to a relatively large number of clients 10 or from multiple clients 10 to one or more servers 14 through distributed memory switching hub 18. It is with less frequency that data traffic flows between clients 10 on different CSMA/CD LAN segments 12 coupled to distributed memory switching hub 18. As will be seen, distributed memory switching hub 18 is designed to optimally operate in a client/server computing environment employing an enterprise-wide internetwork topology.

Figure 4:
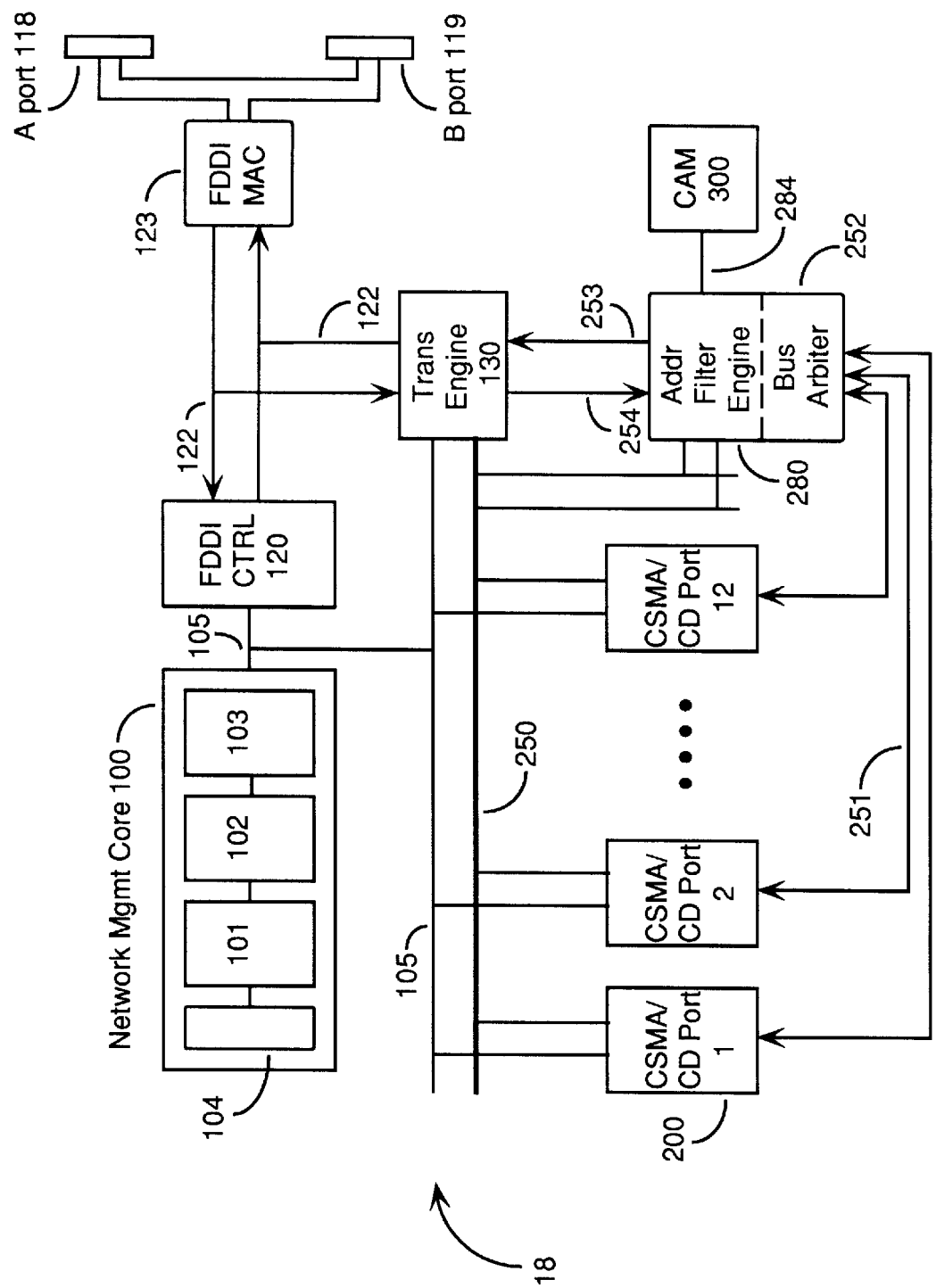
FIG. 4 is a block diagram of an embodiment of the distributed memory switching hub.

Referring now to FIG. 4, a block diagram illustrating the elements of an embodiment of the present invention is shown. Distributed memory switching hub 18 comprises a network management core 100. In the embodiment, network management core 100 is comprised of a 80386SX microprocessor 101 manufactured by Intel Corporation, Santa Clara, Calif. The network management core further comprises a flash electrically erasable programmable read only memory (Flash EEPROM) 102 or other nonvolatile memory storage device. Flash EEPROM 102 contains firmware for initializing distributed memory switching hub 18 upon boot up and for performing power-on self test routines. The power-on self test and initialization of all components of distributed memory switching hub 18 are carried out over control bus 105, which couples together all components. Control bus 105 also provides a communications pathway between all components for soft- and hard-error handling routines and for gathering statistical information for network management core 100. Station management (SMT) and simple network management (SNMP) agent software is also maintained in Flash EEPROM 102 for remote network management. Software can be downloaded over the data network to easily upgrade the on-board firmware. Also within network management core 100 is random access memory (RAM) 103 or other volatile memory storage device for buffering SNMP traps to be transmitted and SMT and SNMP network management requests and responses. A 9-pin D-type serial port 104 allows a network administrator to connect an asynchronous RS-232 cable from a dumb terminal to serial port 104 for local network management of distributed memory switching hub 18.

Distributed memory switching hub 18 also includes a dual attach FDDI port having an A port 118 and a B port 119 for connection to a FDDI dual ring local area network topology. A FDDI media access controller (MAC) 123 controls access to the physical FDDI medium. FDDI controller 120 is coupled to FDDI MAC 123 via two unidirectional buses, one for receiving FDDI frames, the other for transmitting FDDI frames, collectively termed FDDI bus extension 122. FDDI controller 120 monitors all FDDI frames on the FDDI ring. If the destination MAC address of a frame is that of FDDI MAC 123, or the frame is a SMT network management frame as determined by the frame control field within the frame, FDDI controller 120 copies the frame to network management core 100 via control bus 105. Otherwise, the frame is considered a data frame ("asynchronous LLC information frame") and copied to translation engine 130 via the receive bus of FDDI bus extension 122.

Translation engine 130 is also coupled to internal data bus 250, hereafter referred to as data bus 250, and translates FDDI frames into the appropriate Ethernet or IEEE 802.3 MAC frame format prior to transmission to a CSMA/CD LAN port 200. Translation engine 130 couples the receive bus and the transmit bus of FDDI bus extension 122 extending from FDDI MAC 123 to data bus 250. In an embodiment of the present invention, data bus 250 is operating at the FDDI byte rate of 12.5 Mbytes per second, thus, no buffering between data bus 250 and a FDDI ring coupled to FDDI MAC 123 is necessary. All CSMA/CD LAN data frames of data appearing on data bus 250 are translated and forwarded by translation engine 130 to FDDI MAC 123 over the transmit bus of FDDI bus extension 122. Likewise, all FDDI data frames received by FDDI MAC 123 are forwarded over the receive bus of FDDI bus extension 122 and through translation engine 130 to data bus 250. Translation engine 130 is also responsible for determining whether frames originating from network management core 100 and forwarded to FDDI controller 120 via control bus 105 or data frames originating from data bus 250 are transmitted via the transmit bus of FDDI bus extension 122 and FDDI MAC 123 to the FDDI ring coupled to FDDI A port 118 and B port 119.

Additionally, translation engine 130 is responsible for arbitrating between FDDI MAC 123 and CSMA/CD LAN ports 200, collectively, for driving frames onto data bus 250. In the present embodiment, up to twelve CSMA/CD LAN ports 200 are coupled to data bus 250. Data bus 250 provides a high speed data communications pathway for data transferred between the FDDI ring attached to FDDI A port 118 and B port 119 and CSMA/CD LAN segments attached to CSMA/CD LAN ports 200. CSMA/CD LAN ports 200 provide memory storage for frames received and frames to be transmitted to attached CSMA/CD LANs. Access to data bus 250 is controlled by internal data bus arbiter 252, or simply, bus arbiter 252, coupled to data bus 250. Bus arbiter 252 determines which CSMA/CD LAN port 200 coupled to data bus 250 can transmit data onto the bus. When a CSMA/CD LAN port 200 wants to transfer a frame of data onto data bus 250, it signals bus arbiter 252 via control line 251. Bus arbiter 252 then forwards the request to translation engine 130 via unidirectional control line 253. Translation engine 130 notifies FDDI MAC 123 to capture the FDDI token. Once FDDI MAC 123 has the token, translation engine 130 notifies bus arbiter 252 via control line 254 that the token has been captured and it is ready to begin transmitting a frame of data onto FDDI bus extension 122. Bus arbiter 252, in turn, notifies CSMA/CD LAN port 200 via control line 251 to begin transferring the frame of data onto data bus 250, at which time translation engine 130 will receive, translate and forward the frame onto FDDI bus extension 122. Thus, while bus arbiter 252 controls which CSMA/CD LAN port 200 will transfer a frame of data onto data bus 250, translation engine 130 determines when the transfer will occur based on its communication with FDDI MAC 123.

Address filter engine 280 is also coupled to data bus 250. In the embodiment shown in FIG. 4, it is advantageous for address filter engine 180 and bus arbiter 252 to exist on the same chip because of the close relationship between the functions each perform. However, it can be readily seen by one of ordinary skill in the art that they could be implemented on separate chips. Address filter engine 280 monitors the destination MAC address of each frame placed on data bus 250 and compares it to an entry in content addressable memory (CAM) 300 to determine the correct destination LAN port for the frame. CAM 300 contains the MAC address of each client coupled directly or indirectly via a 10Base-T hub 17 to a CSMA/CD LAN port 200, together with the CSMA/CD LAN port number and status information. CAM 300 learns and maintains a list of MAC addresses based on the source MAC address of each frame that traverses data bus 250 and the CSMA/CD LAN port number from which the frame was transferred.

C. Detailed Functional Description

A detailed description of the data flow from a CSMA/CD LAN to a FDDI ring and from a FDDI ring to a CSMA/CD LAN as it pertains to the components of an embodiment of distributed memory switching hub 18.

1. CSMA/CD LAN to FDDI Ring Data Flow

Referring to FIG. 4, CSMA/CD LAN to FDDI data flow occurs as follows. Frames of data are received by a CSMA/CD LAN port 200, and stored in first-in, first-out (FIFO) order in video dynamic random access memory (VRAM) 205 (shown in FIG. 5) located within CSMA/CD LAN port 200. Upon receiving a complete frame, CSMA/CD LAN port 200 requests mastership of data bus 250 from bus arbiter 252 via control line 251. Bus arbiter 252, in turn, notifies translation engine 130 that a CSMA/CD LAN port 200 is ready to transfer a frame of data onto data bus 250. Because there is no buffering of data between the FDDI ring and data bus 250, translation engine 130 first needs to notify FDDI MAC 123 and wait until it secures a FDDI token. A grant signal is returned by bus arbiter 252 to CSMA/CD LAN port 200 via control line 251 when FDDI MAC 123 has acquired a FDDI token. At this time, CSMA/CD LAN port 200 will transfer the frame onto data bus 250.

Address filter engine 280 monitors the frame as it is transferred onto data bus 250. It compares the destination MAC address in the frame to MAC address entries in content addressable memory (CAM) 300. If a matching MAC address entry is found in CAM 300, address filter engine 280 determines the correct destination CSMA/CD LAN port(s) for the frame. Additionally, address filter engine 280 verifies that the source MAC address in the frame and the CSMA/CD LAN port number from which the frame of data was received match the MAC address and CSMA/CD LAN port number entry in CAM 300. This indicates that a client 10 from which the frame was transmitted is still alive on the same CSMA/CD LAN segment 12 and has not been moved to a different CSMA/CD LAN segment 12.

Regardless of the destination LAN for the frame that is now on data bus 250, in an embodiment of the present invention, translation engine 130 receives, translates and forwards the frame to an attached FDDI ring via FDDI bus extension 122, FDDI MAC 123 and FDDI A port 118 and B port 119. As described above, in the present embodiment, there is no buffering of data between the FDDI ring and data bus 250, although other embodiments may allow for buffering of data. Thus, it is necessary before transferring a frame of data onto data bus 250 for a CSMA/CD LAN port 200 to request mastership of data bus 250 from bus arbiter 252 and wait until a grant signal indicating FDDI MAC 123 has acquired a FDDI token is returned via control line 251 to CSMA/CD LAN port 200. Each CSMA/CD LAN port 200 also begins copying the frame from data bus 250 into their respective VRAM 205. Address filter engine 280 signals all CSMA/CD LAN ports that are not supposed to forward the frame to stop copying the frame and flush the contents of the frame from their VRAM 205. However, if the destination LAN port for the frame is another CSMA/CD LAN port 200, or multiple CSMA/CD LAN ports 200 in the case of a multicast or broadcast frame, the frame will also be copied into VRAM 205 located within that destination CSMA/CD LAN port 200 and then transmitted out onto the attached CSMA/CD LAN segment 12.

2. FDDI Ring to CSMA/CD LAN Data Flow

FDDI to CSMA/CD LAN data flow is as follows. FDDI controller 120 monitors all frames on the FDDI ring. FDDI controller 120 copies SMT network management frames to network management core 100. Data frames ("asynchronous LLC information frames") are copied by translation engine 130, which performs necessary frame format translation on the frame before placing it on data bus 250. There is no arbitration performed by bus arbiter 252 before translation engine 130 transfers a frame of data onto data bus 250 because translation engine 130 is the default master of data bus 250. Address filter engine 280 monitors the destination MAC address within the frame and determines the correct destination CSMA/CD LAN ports 200. In an embodiment of the present invention, the source MAC address is not considered because CAM 300 does not maintain entries for end stations, e.g., servers, coupled to the FDDI ring. It is possible later embodiments may maintain entries in CAM 300 for end stations coupled to the FDDI ring. The CSMA/CD LAN ports 200 begin copying the frame into their respective VRAM 205. Shortly thereafter, address filter engine 280, after looking up the destination MAC address in CAM 300, instructs all CSMA/CD LAN ports 200 that are not the destination CSMA/CD LAN port 200 to flush the frame from their VRAM 205. Any remaining CSMA/CD LAN ports 200 completely copy the frame into a circular first-in, first-out (FIFO) queue within VRAM 205. The frame of data is then forwarded onto an attached CSMA/CD LAN segment 12.

3. CSMA/CD LAN Port Operation a. Functional Overview

Figure 5:
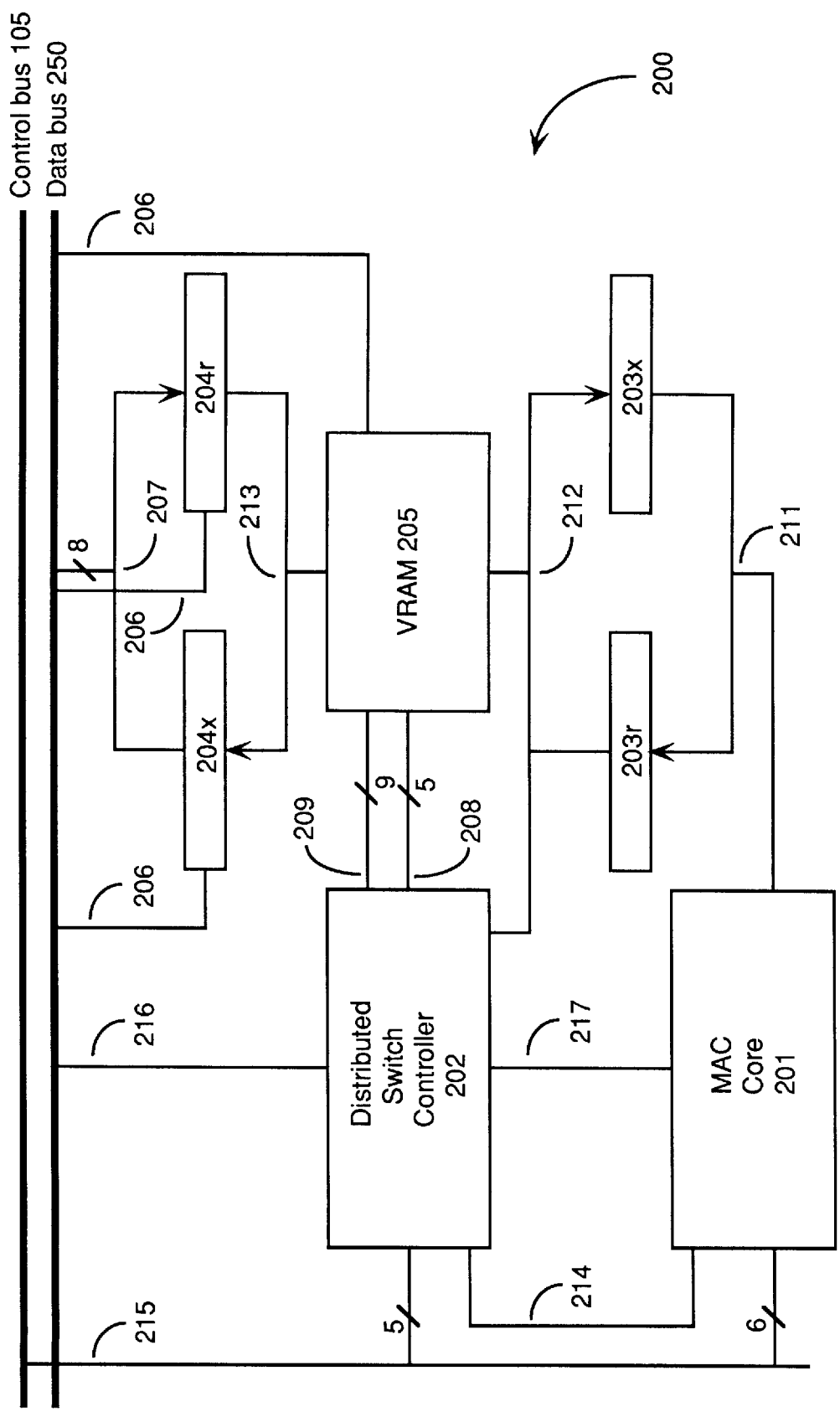
FIG. 5 is a block diagram of an embodiment of the distributed memory architecture of the present invention.
Figure 6:
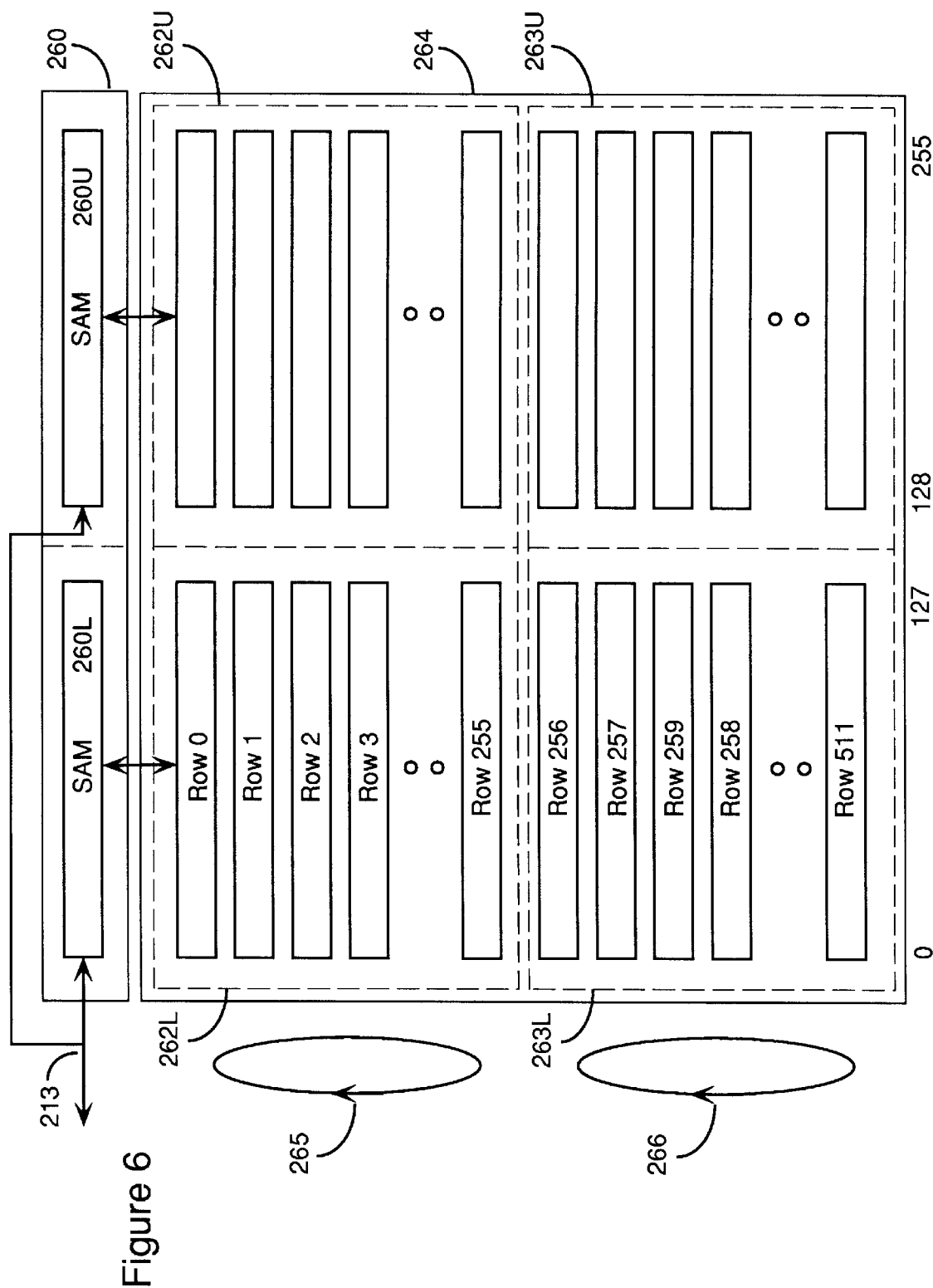
FIG. 6 is a block diagram of an embodiment of a LAN port buffer employing a video dynamic random access memory (VRAM).

Distributed memory switching hub 18 employs a memory architecture in which memory storage is distributed among each of CSMA/CD LAN ports 200. Frames of data received from or to be transmitted to a CSMA/CD LAN coupled to a CSMA/CD LAN port 200 are stored in video dynamic random access memory (VRAM) 205 located within each CSMA/CD LAN port 200. Herein lies an application for the use of VRAM 205. As shown in FIG. 6, VRAM 205 maintains a high speed serial access memory (SAM) port 260 and a low speed dynamic random access memory (RAM) port 264 for transferring frames of data between an attached, low speed CSMA/CD LAN, and data bus 250 operating at a relatively faster data transmission speed of 12.5 Mbyte per second. VRAM 205 performs two functions in this role. First, it stores multiple frames of data to be transferred from an attached CSMAICD LAN to data bus 250, or from data bus 250 to an attached CSMA/CD LAN. Second, as will be described in more detail below, it provides transmission speed, or rate, adaptation between data bus 250 and an attached CSMA/CD LAN. An embodiment of the control logic necessary for VRAM 205 to provide such functionality is shown in FIG. 5. Distributed switch controller 202, hereafter referred to as controller 202, manages the transfer of frames of data between RAM port 264 of VRAM 205 and a CSMA/CD LAN attached to CSMA/CD MAC core 201. Additionally, it controls the interface to data bus 250 and organizes transferring frames of data from RAM port 264 to SAM port 260 within VRAM 205, and then to data bus 250. It organizes VRAM 205 memory into a pair of circular first-in, first-out (FIFO) buffers, or queues, for the storing frames of data and maintains pointers to those frames of data. Furthermore, it retransmits or flushes frames, as appropriate, on both data bus 250 and an attached CSMA/CD LAN. Finally, it controls simultaneous bidirectional transfer of frames of data between data bus 250 and an attached CSMA/CD LAN.

Referring to FIG. 5, VRAM 205 and distributed switch controller 202, as well as other primary components of an embodiment of CSMA/CD LAN port 200 is shown. Each CSMA/CD LAN port 200 is comprised of a CSMA/CD media access controller (MAC) core 201. In an embodiment, MAC core 201 is a standard "Ethernet controller" such as the NCR92C110 controller manufactured by National Cash Register, a subsidiary of AT & T. CSMA/CD MAC core 201 provides MAC level functions well known to those of ordinary skill in the art. It has an eight-bit data interface coupled to registers 203 receive (203r) and 203 transmit (203x) via data path 211 and then to VRAM 205 via data path 212. Register 203r provides temporary storage for each byte of data received from CSMA/CD MAC core 201 in the event VRAM 205 is busy at the time data received by MAC core 201 is transferred to it. Likewise, register 203x provides temporary storage for each byte of data fetched from VRAM 205 to be transmitted onto a CSMA/CD LAN coupled to CSMA/CD MAC core 201. In this way, transfer of bytes of data between MAC core 201 and VRAM 205 can occur, to some extent, without regard to the current state of VRAM 205.

Registers 204r and 204x accomodate timing differences between data bus 250 and VRAM 205. Serial clock lines 206 are controlled by translation engine 130 to inform each of CSMA/CD LAN ports 200 when data bus 250 is available. If a particular CSMA/CD LAN port 200 has been granted access to data bus 250 by bus arbiter 252 at this time, then data can be shifted into or out of VRAM 205 of that CSMA/CD LAN port 200.

Controller 202 provides an interface between data bus 250 and CSMA/CD MAC core 201. It, as well as MAC core 201, is initialized and can be accessed by network management core 100 to gather statistical information for network management functions, etc. Controller 202 utilizes VRAM 205 to act as buffer storage between data bus 250 and a CSMA/CD LAN coupled to CSMA/CD MAC core 201. Control lines 209 function as address lines, allowing controller 202 to maintain pointers used to track multiple frames of data present in VRAM 205. One of control lines 208 control the ability to access a particular region of VRAM 205, which can be split into a lower and upper half, as described below. Control line 214 functions as a reset control line, allowing controller 202 to reset MAC core 201. State machines within controller 202 provide interfaces to both data bus 250 and CSMA/CD MAC core 201 for transmitting and receiving CSMA/CD LAN frames, including such functions as frame retransmission, error recovery, statistics gathering, etc. Controller 202 counts the number of bytes contained in a frame of data received from MAC core 201. When the complete frame has been transferred to data bus 250, controller 202 asserts a signal over control line 216, indicating the end of a frame of data on data bus 250. Control line 217 allows controller 202 to signal MAC core 201 when to receive and when to transmit a byte of data to an attached CSMA/CD LAN.

Each CSMA/CD LAN port 200 receives data from data bus 250 through register 204r and into a high speed serial access memory port of VRAM 205. VRAM 205 is organized in a first-in, first-out (FIFO) manner, so that frames received first from data bus 250 are transmitted first over a CSMA/CD LAN coupled to CSMA/CD LAN port 200. Controller 202 attempts to transmit frames onto an attached CSMA/CD LAN as soon as possible. Likewise, frames received first from an attached CSMA/CD LAN are stored in FIFO manner. At any given time, multiple frames of data may be present within VRAM 205. These frames are transferred over data bus 250 in the same order they were received from an attached CSMA/CD LAN. Once there are frames received from MAC core 201 within VRAM 205, controller 202 will request mastership of data bus 250 from bus arbiter 252. Bus arbiter 252, in turn, notifies translation engine 130, which requests FDDI MAC 123 to obtain an FDDI token. Translation engine 130 notifies bus arbiter 252 once FDDI MAC 123 has obtained a token. Bus arbiter 252, in turn, returns a grant to controller 202. While FDDI MAC 123 has a FDDI token, distributed memory switching hub 18 can transmit frames until a token holding timer expires, as is well understood by those of ordinary skill in the art. Bus arbiter 252 will determine whether, during the time in which the token is held, frames are transmitted from one or more CSMA/CD LAN ports 200. Because the expiration of the token holding timer is nondeterministic with respect to transmission of frames of data onto data bus 250, a controller 202 needs to be able to retransmit a frame at a later time, if the token must be relinquished prior to transmission of a complete frame onto data bus 250. In such a case, controller 202 waits until translation engine 130 drives a signal on data bus 250 instructing it to retransmit the current frame.

b. CSMA/CD LAN Port Buffer Management

Memory storage in distributed memory switching hub 18 is distributed among each CSMA/CD LAN port 200. Each CSMA/CD LAN port 200 includes a video dynamic random access memory (VRAM) 205. In an embodiment of the present invention, VRAM 205 is a MSM518122-JS/JZ VRAM manufactured by OKI Semiconductor. Referring to FIG. 6, the MSM518122-JS/JZ VRAM is a one megabit complimentary metal oxide semiconductor (CMOS) multi-port dynamic random access memory (DRAM) device comprised of a 131,072 word by 8-bit dynamic random access memory (RAM) port 264 and a 256 word by 8-bit static high speed serial access memory (SAM) port 260.

In general, VRAM 205 performs data transfer operations as follows. RAM port 264 and SAM port 260 operate asynchronously with respect to each other. Thus, data may be transferred to or from RAM port 264 independently from data transferred to or from SAM port 260. The method of access includes random access of RAM port 264 and high speed serial access of SAM port 260, with access times of 100 nanoseconds and 25 nanoseconds, respectively. RAM port 264 and SAM port 260 allow for bidirectional transfer of data between any row in RAM port 264 and SAM port 260.

Using terminology consistent with the description in the OKI Semiconductors MSM518122-JS/JZ VRAM data book, a transfer from RAM port 264 to SAM port 260 is a read transfer operation, while a transfer from SAM port 260 to RAM port 264 is a write transfer operation. Serial input to SAM port 260 is a write operation, whereas serial output from SAM port 260 is a read operation. A serial clock, provided over control line 206 in FIG. 5, is a main serial cycle control input signal. All operations on SAM port 260 are synchronized with the serial clock. Data is shifted in or out of SAM port 260 over 8-bit data path 213, registers 204, and 8-bit data path 207, which, in turn, is coupled to data bus 250. High speed serial read or write (output or input) operations can be performed through SAM port 260 independent of RAM port 264 operation, except during read or write transfer operations. The direction of data flow through SAM port 260 is determined by the preceding transfer operation between SAM port 260 and RAM port 264. If the preceding transfer operation was a read transfer from RAM port 264 to SAM port 260, SAM port 260 is in output mode, that is, data may be read from SAM port 260. If, however, the preceding transfer operation was a write transfer from SAM port 260 to RAM port 264, SAM port 260 is in input mode, that is, data may be written to SAM port 260. To change from output mode to input mode, a pseudo write transfer operation between SAM port 260 and RAM port 264 is performed. Unlike a write transfer operation, a pseudo write transfer operation does not actually transfer data from SAM port 260 to RAM port 264, rather it switches SAM port 260 from output mode to input mode (read to write mode). To change back to read mode, a read transfer from RAM port 264 to SAM port 260 is performed.

In an embodiment of the present invention, distributed memory switching hub 18 makes use of a bidirectional split register capability of VRAM 205. In split register mode, SAM port 260 and rows comprising RAM port 264 are both divided into a lower half (bytes 0–127) and an upper-half (bytes 128–255), allowing data to be shifted into or out of (input or output from) either the lower or upper half of SAM port 260 (the active half) while at the same time a split read or a split write transfer operation between SAM port 260 (the nonactive half) and the corresponding half of a row in RAM port 264 is performed. Thus, SAM port 260 can be split into two halves, each of which can be controlled independently by distributed switch controller 202. Address lines 209 and one of control lines 208 coupled between distributed switch controller 202 and VRAM 205 determine to which half of SAM port 260 a read transfer operation of 128 words by 8 bytes of data from RAM port 264 is performed, or to which half of RAM port 264 a write transfer operation of 128 words by 8 bytes of data from SAM port 260 is performed. In a split register mode, serial data can be shifted sequentially in or out of SAM port 260 beginning at any byte location to the most significant byte (255) of SAM port 260 until it wraps around to the least significant byte.

Recall that during non-split transfer operations, SAM port 260 is switched from input mode to output mode by performing a read transfer operation and from output mode to input mode by performing a write or pseudo write transfer operation. However, during split transfer operations, SAM port 260 does not change modes, thus, to change modes, split transfer operations must be preceded by nonsplit transfer operations.

A split read transfer operation reads 128 words by 8 bytes of data from a row of split RAM port 264 as selected by controller 202 via address lines 209 to the nonactive half of split SAM port 260, either SAM port 260 lower (260L) or SAM port 260 upper (260U). Serial data can be shifted out of the active half of split SAM port 260 to data bus 250 simultaneously. Furthermore, during a split read transfer operation from the corresponding half of a row in RAM port 264 to the inactive half of SAM port 260, input clocks associated with RAM port 264 are not required to be synchronized with the serial clock signal provided to SAM port 260 via control line 206, thus allowing for continuous, real time read transfer of data.

A split write transfer operation writes 128 words by 8 bytes of data from a nonactive half of split SAM port 260, either SAM port 260 lower (260L) or SAM port 260 upper (260U), into the corresponding half of a row of split RAM port 264 as selected by controller 202 via address lines 209. Serial data can be shifted into the active half of split SAM port 260 from data bus 250 simultaneously. Furthermore, during a split write transfer operation from the nonactive half of SAM port 260 to a corresponding half of a row in RAM port 264, input clocks associated with RAM port 264 are not required to be synchronized with the serial clock signal provided to SAM port 260 via control line 206, thus allowing for continuous, real time write transfer of data.

Specifically with respect to transferring frames of data between heterogeneous local area networks operating at different transmission speeds in an embodiment of the present invention shown in FIG. 5, and given the above general description of VRAM 205 data transfer operations, VRAM 205 operates as follows. While the following discussion describes the operation of a singular VRAM 205 within a single CSMA/CD LAN port 200, it should be recognized that this process is performed in duplicate by each VRAM 205 located with each CSMA/CD LAN port 200 present in distributed memory switching hub 18.

Frames of data to be transferred to or from a FDDI ring coupled to FDDI A port 118 and B port 119 of distributed memory switching hub 18 are read from or written to a SAM port 260. More accurately, SAM port 260 serially transfers bytes of data comprising frames of data to and from data bus 250, which in turn, transfers frames of data to and from translation engine 130, and ultimately, a FDDI ring coupled to FDDI MAC 123. SAM port 260 is used because of its high speed capabilities. In an embodiment of the present invention, transfers between data bus 250 and SAM port 260 occur at 12.5 Mbytes per second. When receiving frames of data, SAM port 260 transfers the frames using a split write transfer operation, as described above, to rows of RAM port 264. When transmitting frames of data, SAM port 260 transfers frames using a split read transfer operation, also described above, from rows of RAM port 264. On the other hand, frames of data to be transferred to or from a CSMA/CD LAN coupled to a CSMA/CD LAN port 200 of distributed memory switching hub 18 are written to or read from a RAM port 264. RAM port 264 transfers data sequentially, one byte at a time, to and from MAC core 201, which in turn, under the control of distributed switch controller 202, transfers the data comprising frames of data to and from an attached CSMA/CD LAN segment one byte at a time. RAM port 264 is used for transferring frames of data on an attached CSMA/CD LAN segment because these transfers need only occur at a maximum rate of 800 nanoseconds per byte (1.25 Mbytes per second). Full duplex operation requires 400 nanoseconds per byte (2.5 Mbytes per second).

Frames of data transferred from data bus 250 to an attached CSMA/CD LAN segment are stored in a circular first-in, first-out (FIFO) ring, or queue, as indicated by circular FIFO queue 266 in FIG. 6 comprising rows 257 through 511 in RAM port 264 of VRAM 205. Frames of data transferred from an attached CSMA/CD LAN segment to data bus 250 are also stored in a circular, first-in, first-out (FIFO) ring, as indicated by circular FIFO queue 265 in FIG. 6 comprising rows 1 through 255 in RAM port 264 of VRAM 205. Frames are aligned on row boundaries in both directions of data transfer, thus, all frames use a minimum of one 256-byte row. This allows distributed switch controller 202 to manage, via address lines 209, circular FIFO queues 265 and 266 of RAM port 264 by comparing only row addresses of RAM port 264. The first two bytes of the first row of a frame of data contain the row and column addresses of the last byte of the frame. These bytes are used by controller 202 to determine the end of any frame of data in RAM port 264.

A frame of data from data bus 250 is transferred to a CSMA/CD LAN as follows. Using a write operation, SAM port 260 receives the first 128 bytes of a frame into the lower half of SAM port 260 (260L), beginning at the least significant byte position (0). Once SAM port 260L is full, any remaining data received is shifted into the upper half of SAM port 260 (260U), beginning at the least significant byte position (128). While SAM port 260U is active, a split write transfer operation from SAM port 260L occurs, whereby 128 bytes of data in the inactive half of SAM port 260 are transferred to a first available corresponding row in RAM port 264, i.e., the lower half of a first available row in circular FIFO queue 266 located within region 263L of FIG. 6. When SAM port 260U is full, a pointer incremented by a serial clock input signal provided over control line 206 wraps around and SAM port 260 begins receiving any remaining data in the frame into the lower half of SAM port 260 (260L), which has been emptied by the split write transfer operation just completed. Just as SAM port 260L transferred data to RAM port 264 when SAM port 260U was active, SAM port 260U now performs a split write transfer operation while SAM port 260L is active, transferring its contents to a first available corresponding row in RAM port 264, i.e., the upper half of the same row in circular FIFO queue 266 located within region 263U of FIG. 6. When SAM port 260L is full, the process continues as described, alternatively writing to the active half of SAM port 260 while a split write transfer operation occurs from the other inactive half of SAM port 260 to the corresponding half of a first available row in circular FIFO queue 266. Multiple frames of data can be stored contiguously in circular FIFO queue 266 in this manner.

Pointers managed by controller 202 keep track of the row and column address locations of each frame in circular FIFO queue 266, the values of which are written to the first two bytes of the first row of each frame. Frames thus stored in circular FIFO queue 266 are output from RAM port 264 using a conventional random access memory access method and transmitted by MAC core 201 onto an attached CSMA/CD LAN. A set of pointers manipulated by controller 202 are used during a split write transfer to fill circular FIFO queue 266 with frames of data from data bus 250. Likewise, a separate set of pointers are used to empty FIFO queue 266 as the frames of data are output from RAM port 264.

A frame of data from a CSMA/CD LAN is transferred to data bus 250 in a similar, but opposite manner. Using a conventional random access method, RAM port 264 receives a complete frame of data from a CSMA/CD LAN segment via MAC core 201. As RAM port 264 begins receiving the frame, it writes the data into the lower half of a first available row in circular FIFO queue 265 of RAM port 264 located within region 262L of FIG. 6. Once the lower half of the row is filled, and if the frame has not been completely received, RAM port 264 continues receiving data into the upper half of the same row in circular FIFO queue 265 of RAM port 264 located within region 262U of FIG. 6. If the complete frame requires more than one row, a row counter is incremented and the remaining data in the frame is stored in the lower half of the next contiguous row in circular FIFO queue 265, and so on, until the entire frame has been received. Multiple frames may be received in this manner from an attached CSMA/CD LAN and written to contiguous rows of circular FIFO queue 265 of RAM port 264 using a conventional random access memory access method.

Using a split read transfer operation as described above, frames written from a CSMA/CD LAN to circular FIFO queue 265 are transferred to SAM port 260 in a manner similar to the split write transfer operation. Assuming a CSMA/CD LAN port 200 has been granted a request to transfer data onto data bus 250, RAM port 264 transfers 256 words by 8 bytes of data, that is, an entire first row of a first frame from circular FIFO queue 265 located within regions 262L and 262U of FIG. 6 to SAM port 260. Once SAM port 260 is full, SAM port 260L becomes active, that is, data in SAM port 260L is shifted onto data bus 250, beginning at byte position (2). Upon completion of the read operation from SAM port 260L, if a frame spans more than one row, a split read transfer operation to SAM port 260L occurs, whereby 128 bytes of data representing any remaining data in the frame is transferred into the, now nonactive, lower half of SAM port 260 (260L) from the lower half of the next row in circular FIFO queue 265 of RAM port 264 located within region 262L of FIG. 6. While data is transferred from the lower half of the next row in circular FIFO queue 265 into split SAM port 260L, data continues to be shifted out of the active (upper) half of split SAM port 260 (260U) to data bus 250 simultaneously. SAM port 260U, which by now may have completed its read operation as well, begins performing a split read transfer operation, transferring any remaining data from the upper half of the current row in circular FIFO queue 265 into the upper half of SAM port 260 (260U), which has been emptied by the read operation just completed. As SAM port 260U performs a split read transfer operation from the corresponding half of a row in circular FIFO queue 265, SAM port 260L is active. When the upper half of SAM port 260U is full, the pointer wraps around to the beginning of the lower half of SAM port 260 (260L), and the process continues as described, alternatively reading from the active half of SAM port 260 while a split read transfer operation occurs from the nonactive half of a first row containing a frame of data in circular FIFO queue 265. As in the case with circular FIFO queue 266, multiple frames of data can be stored contiguously in FIFO queue 265. Pointers managed by controller 202 also keep track of the row and column address locations of each frame in ring 265, the values of which are written to the first two bytes of the first row of each frame.

In this manner, distributed memory switching hub 18 can transfer (read) data from a SAM port 260 onto data bus 250 at the same time a corresponding RAM port 264 receives a frame of data from MAC core 201. Likewise, a frame of data can be written from data bus 250 into a SAM port 260 while at the same time a corresponding RAM port 264 transmits a frame of data to MAC core 201, which in turn transmits the frame onto an attached CSMA/CD LAN.

c. Multicast Frames Transmission Rate Logic

Broadcast or multicast storms among interconnected homogeneous LANs are well known among those of ordinary skill in the art. Interconnected heterogeneous LANs operating at different transmission speeds are more susceptible to broadcast or multicast storms because a LAN operating at a relatively faster transmission speed, e.g., 100 Mb/s FDDI, is capable of transmitting large numbers of broadcast or multicast frames to one or more LANs operating at a lower transmission speed, e.g., 10 Mb/s CSMA/CD bus, thereby saturating the bandwidth of the lower speed LANs. An embodiment of the present invention limits the maximum rate at which broadcast or multicast frames are transmitted over low speed LANs coupled to distributed memory switching hub 18 so as to prevent such storms from propagating over the low speed LANs. Furthermore, the maximum broadcast or multicast frames transmission rate can be individually tuned at each low speed LAN port to which is coupled a low speed LAN. Finally, an embodiment of the present invention provides for a burst capability, in which the overall rate at which broadcast and multicast frames are allowed to be transmitted may be exceeded for a finite number of such frames. Such a feature is useful, for example, in the situation where a server multicasts a group of frames back to back at FDDI transmission speed, one for each protocol stack supported by the server, advertising the services that are available on the server. This burst capability is also capable of being individually tuned for each low speed LAN coupled to distributed memory switching hub 18.

Figure 7:
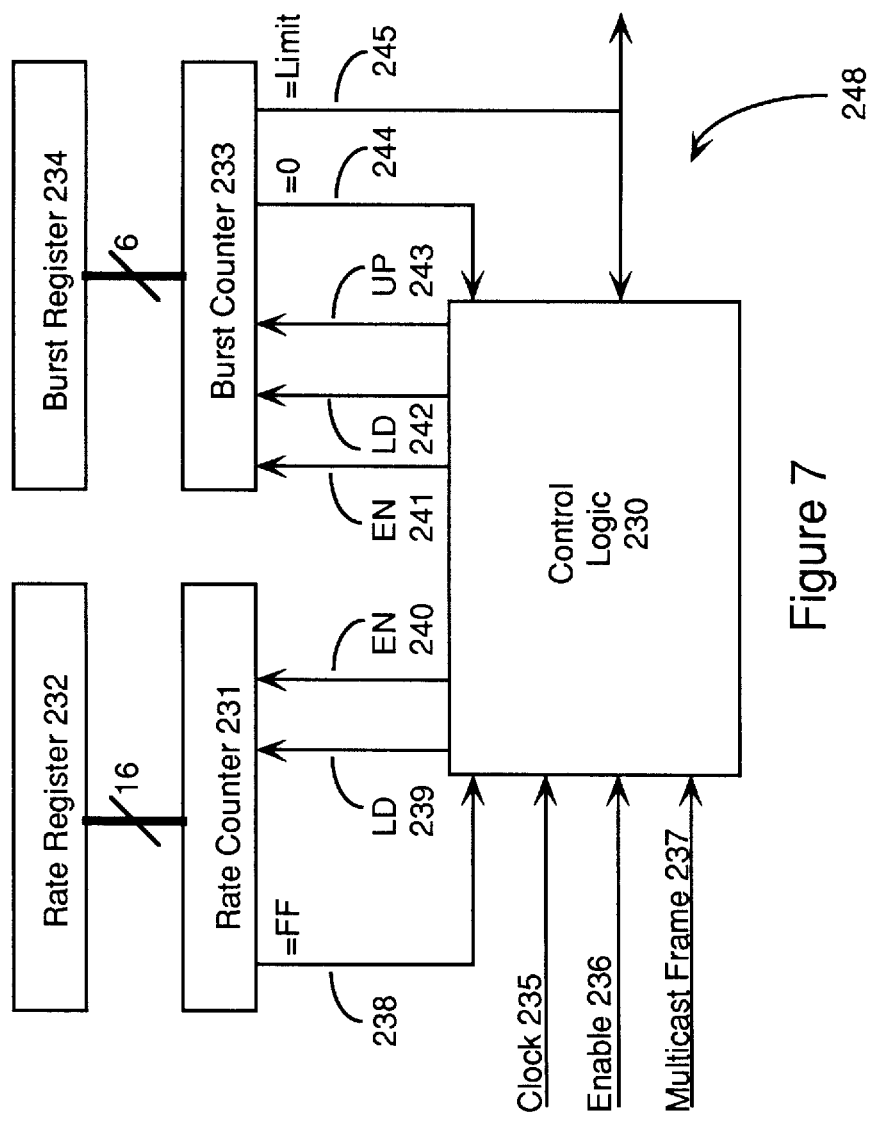
FIG. 7 is a block diagram of an embodiment of the broadcast and multicast frames transmission rate logic.

An embodiment of multicast frames transmission rate logic 248 is shown in FIG. 7. Multicast frames transmission rate logic 248, or simply, multicast rate logic (MRL) 248, is located within distributed switch controller 202 of each CSMA/CD LAN port 200. Although reference herein below is made only to multicast frames, the term encompasses broadcast frames as well. There is a difference between the two types of frames, however, MRL 248 treats both multicast and broadcast frames in the same manner. Both frame types set to one the individual/group (I/G) bit (the least significant bit of the most significant byte) of the destination MAC address field of an IEEE 802.3 or Ethernet frame to indicate a multidestination MAC address. A multicast frame, in which not all of the lower 46 bits of the destination address are set to one, is recognized by a logically related group of one or more stations, whereas a broadcast frame, in which all of the lower 46 bits of the destination MAC address field are set to one, is recognized by all stations on a given local area network. Thus, before CSMA/CD LAN port 200 transmits a frame onto its attached CSMA/CD LAN, distributed switch controller 202 need only determine whether the I/G bit of the destination MAC address field within the frame is set to one. If the I/G bit is set to one, it signals MRL 248. MRL 248 then determines whether the frame should, indeed, be transmitted and signals distributed switch controller 202 accordingly. Distributed switch controller 202, in turn, either discards or forwards the frame of data out CSMA/CD port 200 onto attached CSMA/CD LAN segment 12.

Although an embodiment of the present invention shown in FIG. 7 limits the rate at which both multicast and broadcast frames are transmitted over low speed LANs coupled to dynamic memory switching hub 18, it can be readily seen that the concept is not limited to only those frame types but could include directed frames as well. Furthermore, the logic could be applied to any MAC layer device capable of interconnecting heterogeneous or homogeneous local area networks.

A description of multicast frames transmission rate logic (MRL) 248 follows. Referring to FIG. 7, MRL 248 is principally comprised of control logic 230 and two programmable counter circuits. The first counter circuit comprises a rate register 232 and rate counter 231 indicating the maximum number of multicast frames per second (fps) allowed to be transmitted out a particular CSMA/CD LAN port 200. The second counter circuit comprises burst register 234 and burst counter 233 indicating the maximum number of successive multicast frames that can be transmitted at a rate in excess of the overall maximum rate set by rate counter 231 without incurring any loss of multicast frames. Control line 236 carries a signal which enables MRL 248, while control line 237 carries a signal from distributed switch controller 202 indicating a multicast frame has been detected. Control line 245 carries a signal to distributed switch controller 202 from MRL 248 indicating whether a multicast frame should be transmitted by distributed switch controller 202.

Rate counter 231 is initially set to zero and incremented every clock cycle until it exceeds the value loaded into rate register 232, at which time it overflows, informs control logic 230 via control line 238 of the overflow condition, is reloaded by control logic 230 via control line 239, and begins incrementing from zero again. Rate counter 231 is enabled by control logic 230 via control line 240 each clock cycle in order to increment its count. The clock cycle interval is programmable and, in an embodiment of the present invention, set to 15 μs (microseconds). Control line 235 provides a clock signal to control logic 230. The inverse of a 15 μs clock cycle interval is 66,666 cycles per second, thus, rate counter 231 can allow up to 66,666 multicast fps to be transmitted. In an embodiment of the present invention, rate register 232 is loaded with the ones complement of a value that when multiplied by the clock interval, equals the inverse of the maximum rate at which MRL 248 will allow multicast frames to be transmitted. For example, given a maximum multicast frames transmission rate of 1000 frames per second and a clock cycle interval of 15 μs, the ones complement of the value of 67(d) is loaded into rate register 232. 67 clock cycles, each 15 μs in duration, equals 1000 μs, or 1 ms, which is the inverse of 1000 frames per second. Thus, rate counter 231 overflows when the ones complement reaches FF(h) after 67 clock cycles, that is, every millisecond. Burst counter 233 is enabled by control logic 230 via control line 241, loaded with an initial value equal to the ones complement of register 234 from control logic 230 via control line 242, and is incremented every time a multicast frame is transmitted. It is decremented every time rate counter 231 overflows. When it is decremented to the initial value, control line 244 signals control logic 230 that burst count maintained in burst counter 233 is at zero. Burst counter 233 continues to increment each time a multicast frame is transmitted at a rate in excess of that allowed by rate counter 231 until it reaches a preset limit equal to FF(h), i.e., all ones. When burst counter 233 reaches its preset limit, control logic 230 signals distributed switch controller 202 via control line 245 to cease transmitting multicast frames, thereby preventing the transmission of any further multicast frames. Any existing multicast frames queued for transmission are discarded. Additional multicast frames can be transmitted only after burst counter 233 is decremented.

Figure 8:
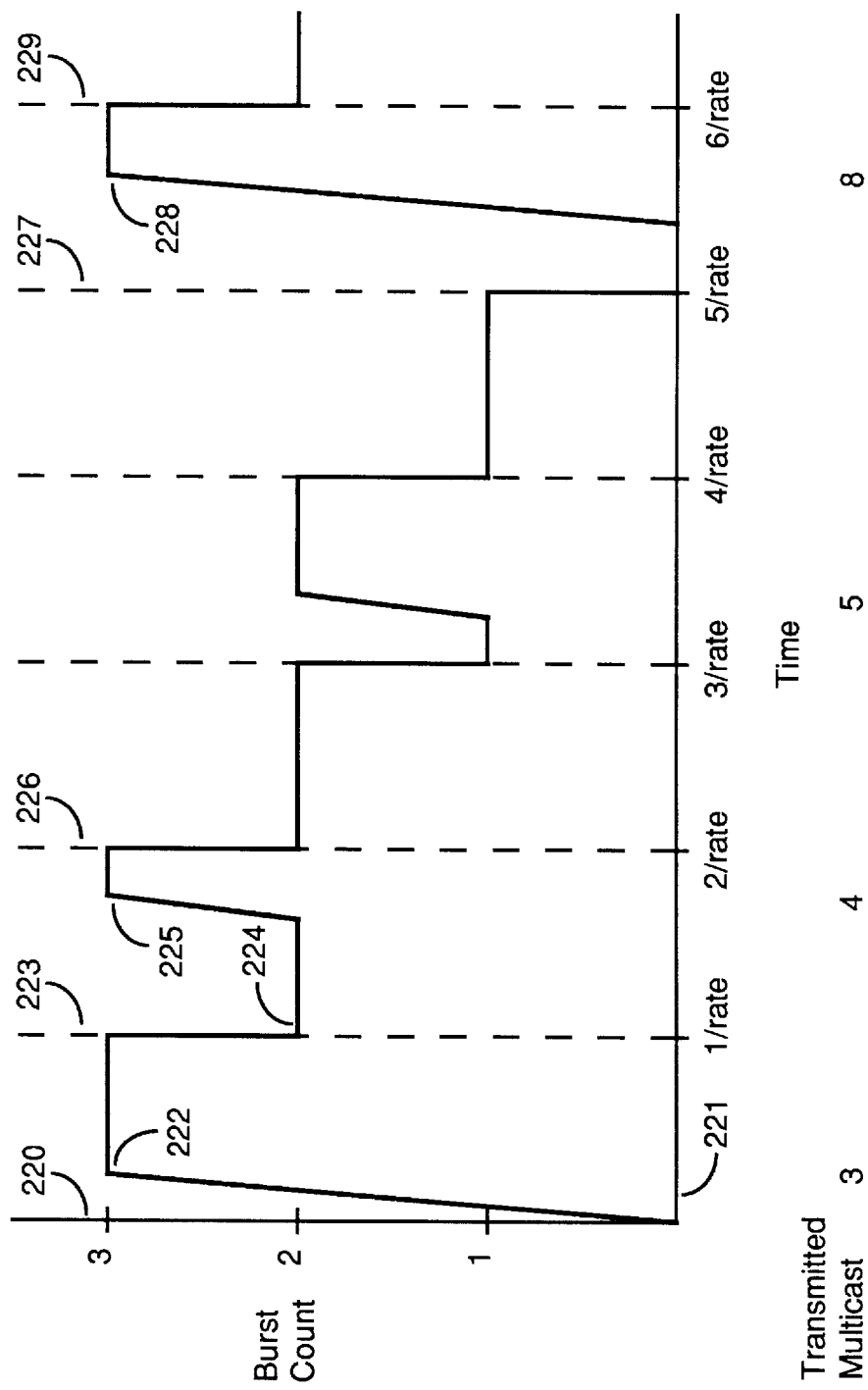
FIG. 8 is a graph demonstrating the limitation of the overall rate and burst rate of transmitted broadcast and multicast frames.

An embodiment showing an example of the interaction between the overall maximum multicast frames transmission rate and burst limit is found in FIG. 8. For purposes of the example, a maximum transmission rate of 1000 multicast fps, a clock cycle interval of 15 μs, and a burst capability of three successive multicast frames is used. Thus, rate counter 231 overflows every millisecond, and burst counter 233 can increment up to three at which point further multicast frames will not be transmitted until burst counter 233 is decremented, as occurs when rate counter 231 overflows.

The graph of FIG. 8 shows the burst count along vertical axis 220 and intervals of time, as specified by the inverse of the maximum multicast frames transmission rate, along horizontal axis 221. Each interval of time is equal to the inverse of the multicast fps maximum transmission rate (1/rate), thus, in this example, using a multicast frames transmission rate of 1000 fps, at time 1/rate (223), 1 millisecond of time has elapsed, and at time 2/rate (225) two milliseconds of time have elapsed. As long as the overall multicast frames transmission rate is less than 1000 fps, all multicast frames are transmitted. When the multicast frames transmission rate exceeds 1000 fps, as when a burst of multicast frames occurs, only a finite number of multicast frames will be transmitted, while the remainder are discarded, according to the burst limit.

Before one millisecond of time expires at time interval 1/rate (223), three multicast frames have already been transmitted as indicated at point 222 on the graph. Each time a multicast frame is transmitted, burst counter 233 is incremented. Burst counter 233 continues to increment until it reaches its preset limit of three at point 222. Burst counter 233 has reached its maximum of three, therefore, further multicast frames are not transmitted until it is decremented. However, burst counter 233 is decremented only when rate counter 231 overflows. Rate counter 231 does not overflow until time 1/rate (223), at which time burst counter 233 is decremented to two as indicated by point 224 on the graph. A fourth multicast frame is transmitted at point 225, and burst counter 233 is again incremented to its limit of three. When rate counter 231 overflows again at time 2/rate (226), burst counter 233 is once more decremented to two. MRL 248 continues to operate in this manner until at time interval 5/rate (227), burst counter 233 is eventually decremented to zero after only one additional multicast frame has been transmitted during the past three milliseconds. However, three additional multicast frames are transmitted within the period of one millisecond as indicated by point 228 on the graph. Burst counter 233 is again at its limit of three until rate counter 231 overflows at time interval 6/rate (229). MRL 248 is now able to transmit one more multicast frame until such time rate counter 231 again overflows and burst counter 233 is decremented again. As one might intuit from of the operation of MRL 248, if burst counter 233 is set to zero, all multicast frames will be discarded. It is further readily seen that the above method of limiting the rate at which multicast frames are transmitted could base the frame forwarding rate on the number of bursts per second rather than the number of frames per second.

In yet another embodiment of MRL 248, every time rate counter 231 overflows, burst counter 233 is reset, rather than decremented. In this way, a number of frames as determined by the value loaded in burst counter 233 can be transmitted immediately after rate counter 231 overflows, rather than just one frame until rate counter 231 overflows again after expiration of another clock cycle. This accommodates a situation such as that discussed earlier where a server multicasts a group of frames in rapid succession at FDDI transmission speed, one for each protocol stack supported by the server, advertising the services that are available on the server.

Thus, MRL 248 allows for the overall maximum transmission rate of multicast frames to be limited, while still allowing a finite burst of multicast frames to be transmitted at a rate in excess of the overall maximum multicast frames transmission rate.

4. Translation Engine a. Guidelines for Frame Format Translation

Before discussing the components and method of operation of translation engine 130 (FIG. 4), it is necessary to describe the general guidelines within which it operates. Translation engine 130 follows the general guidelines governing translation of frame formats as set forth by the Institute of Electrical and Electronics Engineers in *Media*

Access Control For Ethernet V2.0, P802.1h/D5, January, 1994. IEEE project 802.1h addresses problems arising from the interconnection of an Ethernet LAN and IEEE 802.X LANs (IEEE 802.3—CSMA/CD Bus, 802.4—Token Bus, 802.5—Token Ring). The project expands the scope of interoperability among heterogeneous LANs described in DDN Network Information Center, *A Standard for the Transmission of IP Datagrams over IEEE 802 Networks*, Request For Comments (RFC) 1042, February, 1988 and *Transmission of IP and ARP over FDDI Networks*, RFC 1390, January, 1993.

The IEEE P802.1h/D5 does not provide means for communication between two end stations on separate but interconnected homogeneous LANs that are otherwise not capable of communicating when coupled to the same LAN. For example, two end stations on the same CSMA/CD LAN cannot communicate with one another if one uses an IEEE 802.3 MAC frame format and the other uses an Ethernet frame format. Likewise, those two end stations cannot communicate with one another when they exist on separate CSMA/CD LANs interconnected by a MAC layer device such as an embodiment of the present invention.

Figure 9:
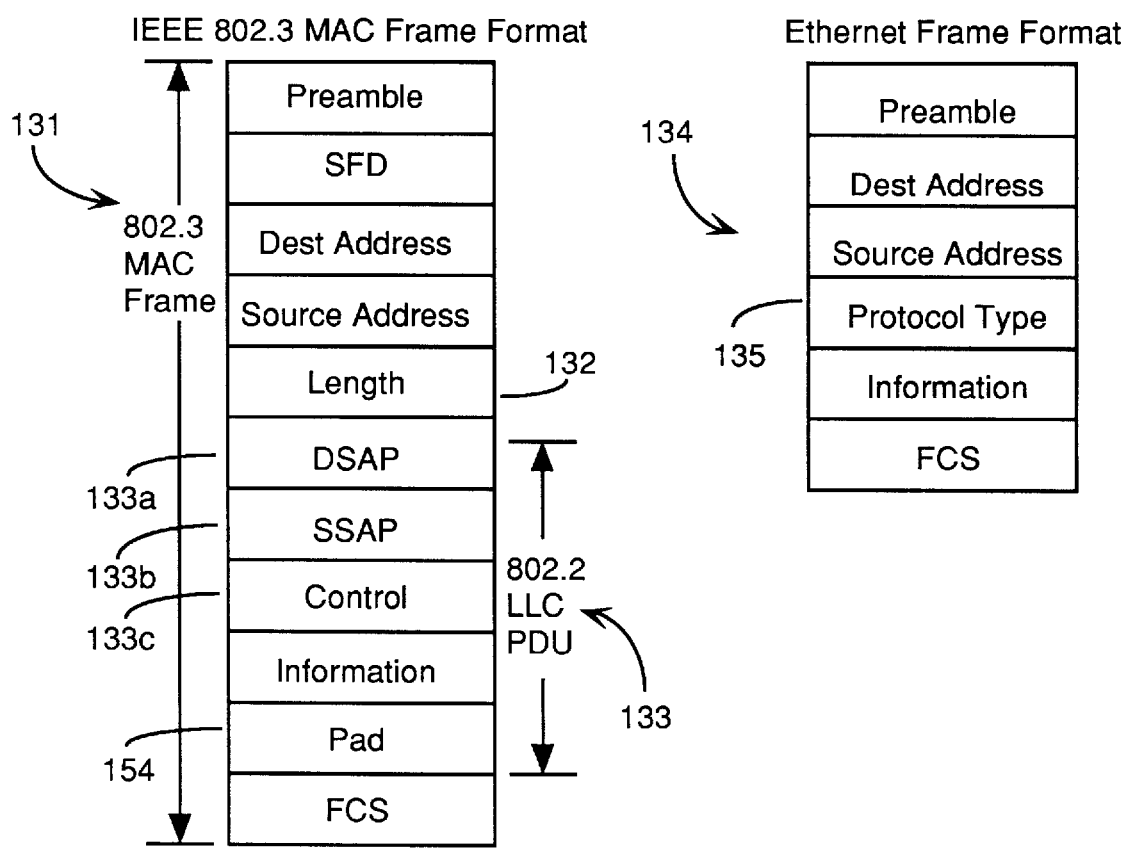
FIG. 9 is a representation of IEEE 802.3 and Ethernet frame formats.

Referring now to FIG. 9, the difference between an Ethernet frame format and an IEEE 802.3 MAC frame format is shown. In the following discussion, FIG. 9 depicts the frame formats of the 802.3 MAC and Ethernet frames in the order of transmission on the medium, with the uppermost fields transmitted first. 802.3 MAC frame 131 begins with a seven-byte preamble field consisting of an alternating bit sequence of 10101010, followed by a one-byte start of frame delimiter (SFD) field consisting of the bit pattern 10101011. Ethernet frame 134 begins with an eight-byte preamble field containing a bit sequence identical to the first eight bytes of the 802.3 MAC frame format. Both frames then contain a 48-bit destination MAC address field followed by a 48-bit source MAC address field. 802.3 MAC frame 131 has a two-byte length field 132 which indicates the number of bytes in IEEE 802.2 LLC protocol data unit (PDU) 133 encapsulated by 802.3 MAC frame 131. If the number of bytes is less than a minimum of 46, pad field 154 is used. Ethernet frame 134, however, has a protocol type field 135 which indicates the higher layer protocol used in the information field, e.g., 0600(h) or 0800(h) for the Xerox Networking Systems (XNS) or Internet Protocol (IP) upper layer protocols, respectively. Thus, in the case of Ethernet, the network layer protocol needs to provide length information and pad, if necessary. Finally, FIG. 9 shows both frames end with a 32-bit frame check sequence (FCS) field. An end station on a CSMA/CD LAN determines whether a received frame is an Ethernet or 802.3 MAC frame by looking at the two-byte field following the source MAC address field. If the value of the field is less than or equal to 1500 (decimal), it is interpreted as a length field, and thus, the frame is considered an 802.3 MAC frame. If, however, the value of the field is greater than 1500 (decimal), it is interpreted as a protocol type field, and thus, the frame is considered an Ethernet frame.

IEEE 802.2 LLC protocol data unit (PDU) 133 within 802.3 MAC frame 131 is comprised of a one-byte destination service access point (DSAP) field 133a and one-byte source service access point (SSAP) field 133b. A service access point (SAP) can be thought of as a port that points to a unique higher layer process within an end station that corresponds to different protocol stacks. The two-byte control field 133c follows. It indicates the type of logical link formed between two end stations, connectionless-oriented (type 1) or connection-oriented (type 2), as defined by IEEE standard 802.2 LLC. While the MAC sublayer of the data link layer of the OSI reference model is specific to a particular local area network architecture, e.g., CSMA/CD, token bus, token ring, FDDI ring, etc., the 802.2 LLC layer is the same regardless of the underlying local area network architecture so as to present the same standard of communication with upper layers of the OSI model.

A MAC layer device such as an embodiment of the present invention necessarily handles the translation of IEEE 802.3 and Ethernet frames differently. When an 802.3 MAC frame is translated to a FDDI or token ring frame, length field 132 is stripped and discarded, because neither FDDI nor token ring frame formats include a length field. If a FDDI or token ring frame is translated to an 802.3 MAC frame, the length of the 802.3 MAC frame is calculated and length field 132 containing this value is inserted. An Ethernet protocol type field 135, however, needs to be preserved when an Ethernet frame is translated to a FDDI or token ring frame. To preserve the Ethernet protocol type field 135, the MAC layer device encapsulates the value within an Ether-Type field in a Subnetwork Access Protocol (SNAP) header. If a FDDI or token ring frame is translated to an Ethernet frame, the SNAP header is stripped and a protocol type field containing the value from the EtherType field is inserted.

Figure 10:
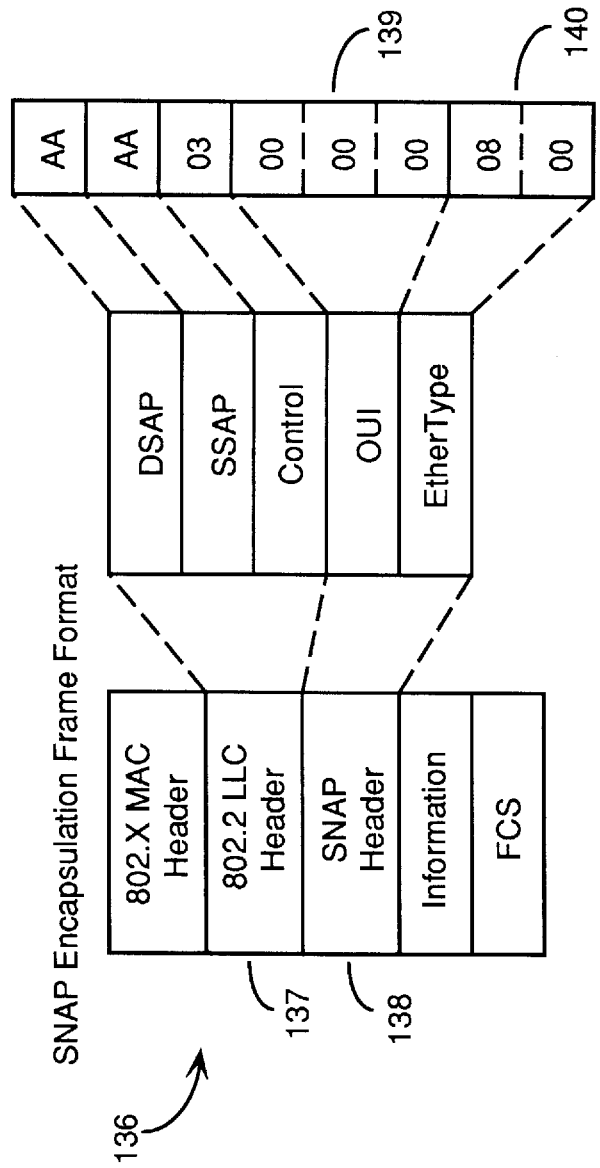
FIG. 10 is a representation of IEEE 802.2 LLC/SNAP encapsulation frame format.

FIG. 10 shows the format of a Subnetwork Access Protocol (SNAP) header 138 encapsulated within an IEEE 802.X MAC frame 136. SNAP header 138 is an extension of IEEE 802.2. LLC header 137. A MAC layer device such as an embodiment of the present invention recognizes the presence of a SNAP header within 802.X MAC frame 136 by the values AA(h) for the DSAP and SSAP fields and 03(h) (unnumbered information) for the control field of 802.2 LLC header 137. SNAP header 138 contains a three-byte Organizational Unique Identifier (OUI) field 139 and is set to all zeros (00-00-00(h)) to indicate a translated Ethernet frame. The two-byte EtherType field 140 follows, containing, for example, the value 0800(h), indicating the upper layer protocol is Internet Protocol (IP).

The following examples illustrate what happens to an Ethernet or IEEE 802.3 MAC frame when forwarded by a MAC layer device from a CSMA/CD LAN to a FDDI ring or from a FDDI ring to a CSMA/CD LAN. Athough the following examples involve only CSMA/CD and FDDI LANs, the same rules apply when forwarding Ethernet or IEEE 802.3 MAC frames from a CSMA/CD LAN to an IEEE 802.X (IEEE 802.4 Token Bus, IEEE 802.5 Token Ring) LAN, or vise versa, as well.

IEEE 802.3 to FDDI

Figure 11:
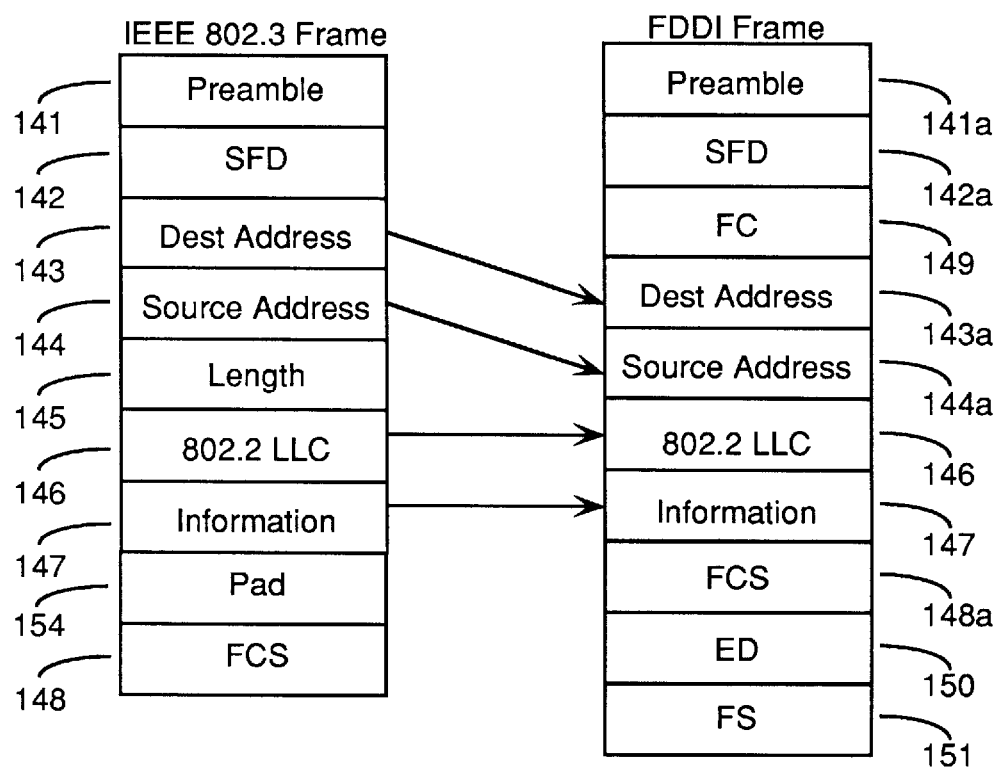
FIG. 11 is a representation of IEEE 802.3 frame format to FDDI frame format translation.

Referring to FIG. 11, when an IEEE 802.3 MAC frame is forwarded from a CSMA/CD LAN to a FDDI ring, only the MAC header is translated. The IEEE 802.2 LLC header is not modified because the LLC layer remains the same regardless of the underlying local area network architecture. Each field of the 802.3 MAC frame is treated as follows. 802.3 preamble field 141 and start of frame delimiter (SFD) field 142 are discarded. FDDI preamble field 141a and SFD field 142a are typically reconstructed by the FDDI physical layer hardware. One-byte frame control (FC) field 149 is constructed and inserted before FDDI destination MAC address field 143a. The bit-order sequence of each byte of destination and source 802.3 MAC address fields, 143 and 144 respectively, is manipulated from canonical to noncanonical format and copied to the FDDI frame as destination and source MAC address fields 143a and 144a, respectively. Length field 145 is less than or equal to 1500 bytes, indicating this is the length field of an IEEE 802.3 MAC frame, not a protocol type field of an Ethernet frame. This field is discarded because no such field is used in FDDI. 802.2 LLC field 146 and information field 147 are copied unchanged from the 802.3 MAC frame to the FDDI frame's LLC and information fields 146*a* and 147*a*. Pad field 154 is discarded, since there is no minimum allowable frame length beyond the MAC header of a FDDI frame. FCS field 148 of the 802.3 MAC frame is also discarded. A new FDDI FCS 148*a* is recalculated. FDDI end delimiter (ED) field 150 and frame status (FS) field 151 are typically constructed by the FDDI physical layer hardware.

FDDI to IEEE 802.3

Figure 12:
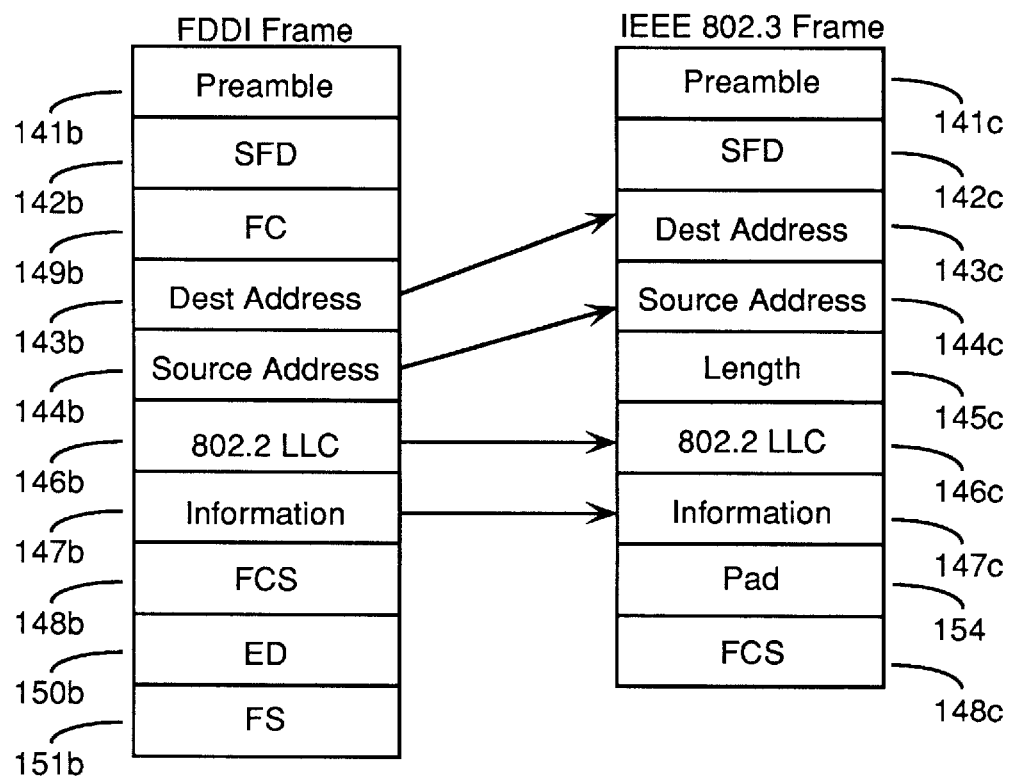
FIG. 12 is a representation of FDDI frame format to IEEE 802.3 frame format translation.

A FDDI frame may be translated to an IEEE 802.3 MAC frame or an Ethernet frame when forwarded to a CSMA/CD LAN. FIG. 12 shows the translation from FDDI to IEEE 802.3 MAC frame format. As is the case when an IEEE 802.3 MAC frame is forwarded from a CSMA/CD LAN to a FDDI ring, the IEEE 802.2 LLC header is not modified. The most important step in the translation process is the calculation and insertion of 802.3 length field 145*c*. FDDI preamble field 141 b, start of frame delimiter (SFD) field 142*b*, and frame control (FC) field 149*b* are discarded. 802.3 preamble field 141*c* and SFD field 142*c* are typically reconstructed by the 802.3 physical layer hardware. No frame control field 149*b* is reconstructed because it is not used in the IEEE 802.3 MAC frame. The bit-order sequence of each byte of FDDI destination MAC address field 143*b* and source MAC address field 144*b* is manipulated from non-canonical to canonical format and copied to the 802.3 MAC frame as destination and source MAC address fields 143*c* and 144*c*, respectively. If no SNAP header exists in 802.2 LLC field 146*b*, 802.3 length field 145*c* is calculated and inserted in the 802.3 MAC frame. 802.2 LLC field 146*b* is copied unchanged from the FDDI frame to the 802.3 MAC frame's LLC field 146*c*. If information field 147*b* is larger than the maximum transmission unit (MTU) of 1500 bytes supported by a CSMA/CD LAN, then it is discarded, otherwise it is copied to information field 147*c*. If the length of information field 147*c* is such that the frame length is less than the minimum frame length recommended by the IEEE 802.3 MAC layer standard, pad field 154 of length necessary to meet the minimum frame size is inserted. FDDI FCS field 148*b* is discarded and new FCS field 148*c* for the 802.3 MAC frame is recalculated and appended as the 802.3 MAC frame trailer.

Ethernet to FDDI

Figure 13:
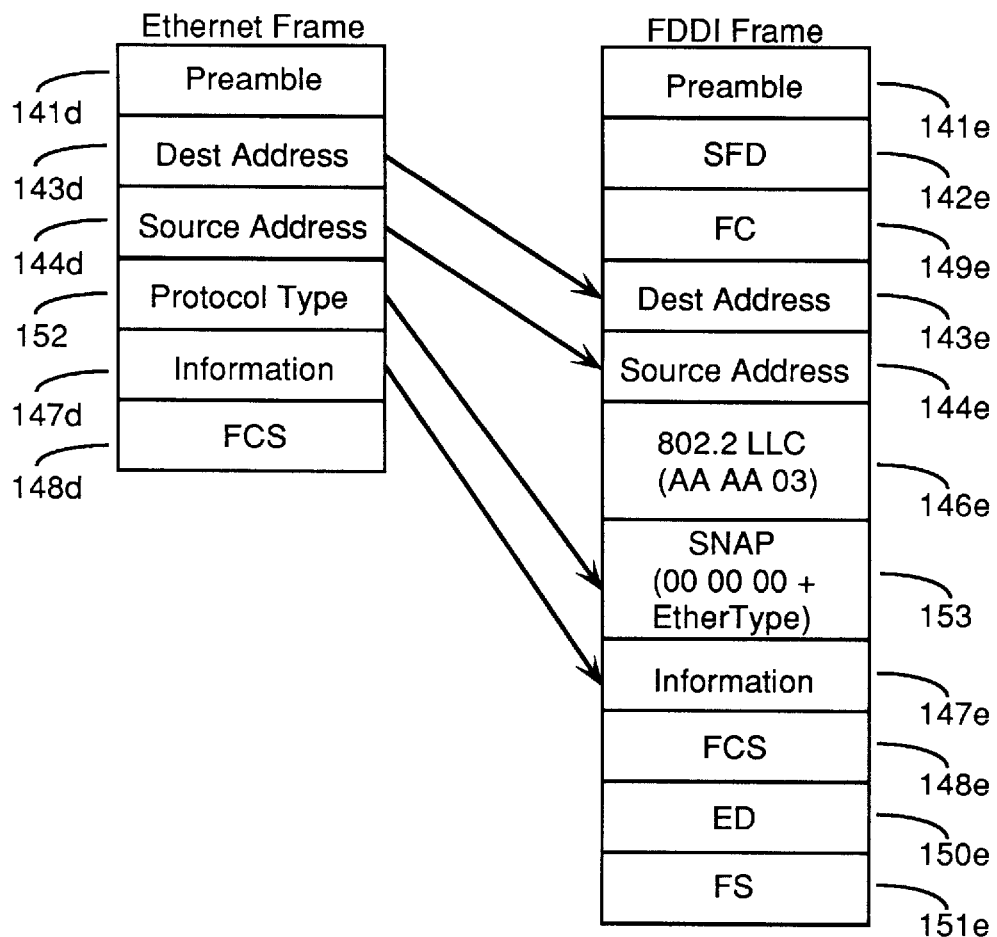
FIG. 13 is a representation of Ethernet frame format to FDDI frame format translation.

The example illustrated in FIG. 11 involved translating IEEE 802.3 MAC frames as they were forwarded from a CSMA/CD LAN to a FDDI ring. FIG. 13 illustrates translating an Ethernet frame to a FDDI frame, as occurs when the frame is forwarded from a CSMA/CD LAN to a FDDI ring. IEEE 802.X and FDDI LANs do not support the Ethernet frame format 134 of FIG. 9. SNAP header 138 of FIG. 10 provides a means for translating Ethernet frame 134 to a MAC type supported by IEEE 802.X or FDDI LANs while at the same time preserving the Ethernet protocol type field 135 so that end stations on a CSMA/CD LAN using the Ethernet frame format can successfully communicate with end stations on IEEE 802.X or FDDI LANs. Referring again to FIG. 13, Ethernet preamble field 141*d* is discarded. FDDI preamble field 141*e* is typically reconstructed by the FDDI physical layer hardware. FDDI start of frame delimiter (SFD) field 142*e* is constructed as needed and inserted before FDDI destination MAC address field 143*e*. The bit-order sequence of each byte of Ethernet destination and source MAC address fields 143*d* and 144*d* is manipulated from canonical to noncanonical format and copied to the FDDI frame as destination and source MAC address fields 143*e* and 144*e*. An 802.2 LLC header 146*e* is inserted, using reserved DSAP and SSAP values of AA(h) indicating that a SNAP header extension of the 802.2 LLC header is present. Field 152 of the Ethernet frame has a value greater than 1500 decimal, indicating that the field represents the protocol type field of an Ethernet frame, not the length field of an IEEE 802.3 MAC frame, and thus, the field needs to be preserved, not discarded. Protocol type field 152 is encapsulated (and termed the EtherType field) in SNAP header 153 following a three-byte Organizational Unique Identifier (OUI) set to zero in accordance with Ethernet frame format translation guidelines set forth in DDN Network Information Center RFCs 1042 and 1390. Information field 147*d* is copied unchanged from the Ethernet frame to the FDDI frame information field 147*e*. FCS field 148 of the 802.3 MAC frame is discarded. A new FDDI FCS field 148*a* is recalculated. FDDI end delimiter (ED) field 150*e* and frame status (FS) field 151*e* are typically constructed by the FDDI physical layer hardware.

FDDI to Ethernet

FIG. 13 shows how a FDDI ring supports Ethernet frames using the SNAP encapsulation extension of 802.2 LLC with a OUI of zero (00-00-00(h)) to preserve the protocol type field. Although translation from an Ethernet frame format to a SNAP encapsulated frame format is straightforward, ambiguity arises when forwarding a SNAP encapsulated frame with a OUI of zero to a CSMA/CD LAN. Since a CSMA/CD LAN is also considered an IEEE 802.X (IEEE 802.3) LAN, an 802.3 MAC/802.2 LLC/SNAP encapsulated frame with a OUI of zero is valid on a CSMA/CD LAN as well. Thus, the issue arises whether a FDDI frame employing the 802.2 LLC/SNAP encapsulated frame format with a OUI of zero should be preserved or translated to Ethernet frame format when forwarded to a CSMA/CD LAN. The ambiguity arises because the 802.2 LLC/SNAP encapsulated frame does not contain, by itself, the information necessary for a MAC layer device such as an embodiment of the present invention to make that decision. The MAC layer device does not know, for example, if a frame was originally generated by an end station on a CSMA/CD LAN using Ethernet frame format and then translated to 802.2 LLC/SNAP encapsulated frame format with a OUI of zero for transmission over FDDI, or if a frame was originally generated by an end station on a CSMA/CD LAN using 802.3 MAC/802.2 LLC/SNAP encapsulated frame format with a OUI of zero and then translated only at the MAC layer for transmission over FDDI.

MAC layer devices can preserve 802.2 LLC/SNAP encapsulated frames with a OUI of zero by maintaining an internal translation table or similar mechanism that recognizes upper layer protocols that use 802.2 LLC/SNAP encapsulated frame format with a OUI of zero (00-00-00(h)) on CSMA/CD LANs. If the value of the EtherType field 140 of FIG. 10 is recognized by the MAC layer device, the 802.2 LLC/SNAP encapsulated frame format with a OUI of zero is maintained as the frame is transmitted, regardless of the type of LAN; only the MAC header is translated. If the value of the EtherType field is one which the MAC layer device does not recognize, the frame is translated to Ethernet frame format before forwarding it to a CSMA/CD LAN.

Likewise, if a MAC layer device coupled to a CSMA/CD LAN receives an Ethernet frame whose protocol type field value is recognized, it may translate the Ethernet frame into the 802.2 LLC/SNAP encapsulated frame format, but with a nonzero OUI of 00-00-F8(h). If the protocol type is not recognized, the Ethernet frame is translated into the 802.2 LLC/SNAP encapsulated frame format with a OUI of zero in accordance with recommended industry guidelines. In this way, 802.2 LLC/SNAP encapsulated frames on a CSMA/CD LAN can be preserved when forwarded across FDDI or 802.X LANs to another CSMA/CD LAN, and are not incorrectly translated into Ethernet frames when thereafter forwarded to another, remote CSMA/CD LAN. Frames of data that originate as Ethernet frames on a CSMA/CD LAN and are translated for transmission across a FDDI ring are translated back to Ethernet frames when forwarded to other CSMA/CD LANs. Currently, the only protocol type that the IEEE project 802.1h committee recognizes as making use of 802.2 LLC/SNAP encapsulated frame format with a OUI of zero on CSMA/CD LANs is AppleTalk Phase II address resolution protocol (ARP) messages.

Translating AppleTalk ARP Messages

AppleTalk Phase 1 (AT-1) ARP frames are encoded in an Ethernet frame on a CSMA/CD LAN. The value of the protocol type field is 80F3(h). However, AppleTalk Phase 2 (AT-2) ARP frames are encoded in an IEEE 802.3 MAC/802.2 LLC/SNAP frame. The value of the EtherType field in the SNAP header is also 80F3(h). The Organizational Unique Identifier (OUI) field in the SNAP header contains the value 00-00-00(h), that is, the same value for the OUI specified by DDN Network Information Center RFCs 1042 and 1390 for translating Ethernet frames for transmission across FDDI and IEEE 802.X LANs. This causes ambiguity as to whether the AT-2 ARP frame should be translated back to Ethernet frame format or the 802.2 LLC/SNAP encapsulation format preserved when the frame is forwarded across an IEEE 802.X or FDDI LAN to a CSMA/CD LAN.

If the value of the EtherType field within the SNAP header of an AT-2 ARP frame is not recognized by a MAC layer device as an upper layer protocol that uses SNAP encapsulation frame format with a OUI of zero, the frame is translated to Ethernet frame format before forwarding it to a CSMA/CD LAN. Not knowing any better, the MAC layer device assumes that the 802.X MAC frame or FDDI frame containing an 802.2 LLC/SNAP header with a OUI of 0000-00(h) was originally transmitted as an Ethernet frame, not an IEEE 802.3 MAC/802.2 LLC/SNAP encapsulated frame. This causes connectivity problems because AT-2 end stations on a CSMA/CD LAN only recognize IEEE 802.3 MAC/802.2 LLC/SNAP frames. They do not recognize Ethernet frames.

Only SNAP encapsulated AT-2 ARP frames are involved in this dilemma. AT-2 data frames use an IEEE 802.3 MAC/802.2 LLC/SNAP frame, but properly use a nonzero OUI of 08-00-07(h). As a result, these frames are transparently forwarded by a MAC layer device as 802.2 LLC/SNAP encapsulated frames with only MAC header translation taking place.

The problems related to AT-2 ARP translation have been addressed by the IEEE project 802.1D MAC layer bridging committee in consultation with the designers of the AppleTalk protocol. The discussions resulted in a recommendation outlined in IEEE draft standard 802.1h/D5, and shown in Table 2 below.

TABLE 2

Translating AppleTalk trom CSMA/CD to FDDI to CSMA/CD LAN.

| Frame Types | CSMA/CD LAN | FDDI LAN | CSMA/CD LAN |
|---|---|---|---|
| AT-1 ARP Protocol Type = 80F3(h) | Ethernet | FDDI MAC/ 802.2 LLC/SNAP (OUI = 00-00-F8) | Ethernet |
| AT-2 ARP EtherType = 80F3(h) | 802.3 MAC/802.2 LLC/SNAP (OUI = 00-00-00) | FDDI MAC/ 802.2 LLC/SNAP (OUI = 00-00-00) | 802.3 MAC/802.2 LLC/SNAP (OUI = 00-00-00) |
| AT-1 DATA Protocol Type = 809B(h) | Ethernet | FDDI MAC/ 802.2 LLC/SNAP (OUI = 00-00-00) | Ethernet |
| AT-2 Data EtherType = 809B(h) | 802.3 MAC/802.2 LLC/SNAP (OUI = 08-00-07) | FDDI MAC/ 802.2 LLC/SNAP (OUI = 08-00-07) | 802.3 MAC/802.2 LLC/SNAP (OUI = 08-00-07) |

The recommendation proposes that MAC layer devices translate AT-1 ARP and AT-2 ARP frames differently. AT-1 ARP frames are "tunneled" across a FDDI LAN using a SNAP header with a OUI of 00-00-F8(h). When a MAC layer device performing frame translation receives a frame with a DSAP=AA(h), SSAP=AA(h), control=03(h), and a OUI=00-00-F8(h), it translates the tunneled AT-1 ARP message back into an Ethernet frame on the receiving CSMA/CD LAN. See row one in Table 2 above. AT-2 ARP frames are transmitted using a SNAP header with a OUI of 00-00-00(h). When a MAC layer device performing frame translation receives a frame with a DSAP=AA(h), SSAP=M(h), control=03(h), OUI=00-00-00(h) and EtherType 80F3(h), it preserves the IEEE 802.2 LLC/SNAP encapsulated format and performs only MAC header conversion. See row two in Table 2 above. AT-1 data is translated from Ethernet frame format to 802.2 LLC/SNAP encapsulated frame format according to the general guidelines for supporting Ethernet frames over IEEE 802.X and FDDI LANs. See row three in Table 2 above. AT-2 data frames originate as IEEE 802.3 MAC/802.2 LLC/SNAP encapsulated frames with a nonzero OUI on a CSMA/CD LAN. Because the OUI is properly nonzero, there is no confusion as to whether the frames of data were originally Ethernet frames. Thus, only the MAC header is translated when forwarding the frame between dissimilar LANs. See row four in Table 2 above.

b. Operation of Translation Engine

An embodiment of translation engine 130 translates frames of data between FDDI frame format and Ethernet or IEEE 802.3 frame formats. In this respect, distributed memory switching hub 18 operates in the same manner as a MAC layer bridge interconnecting heterogeneous local area networks in accordance with the recommended guidelines for frame format translation as set forth above. However, it is readily apparent that an embodiment of translation engine 130 could be developed to translate frames of data of any format to any other format.

Translating frames of data from one format to another format incurs processing overhead that can negatively impact a switching hub's throughput. As frames of data are translated from one format to another, some fields may be deleted, causing a gap or space to appear in the data stream where a field once existed. Other fields may be inserted, causing the data stream to halt momentarily as a field is inserted. The bit-order sequence of yet other fields may be reversed, while remaining fields are left unmodified. As will be seen, an embodiment of translation engine 130 can accommodate a continuous input data stream comprised of frames of data without causing the input data stream to back up when inserting a field. Furthermore, it can provide a continuous output data stream without causing a space in the output data stream to occur when deleting a field within a frame of data. Likewise, the bit-order sequence of certain fields can be reversed, while others are left unmodified, without interrupting the continuous flow of the data stream.

Figure 3:
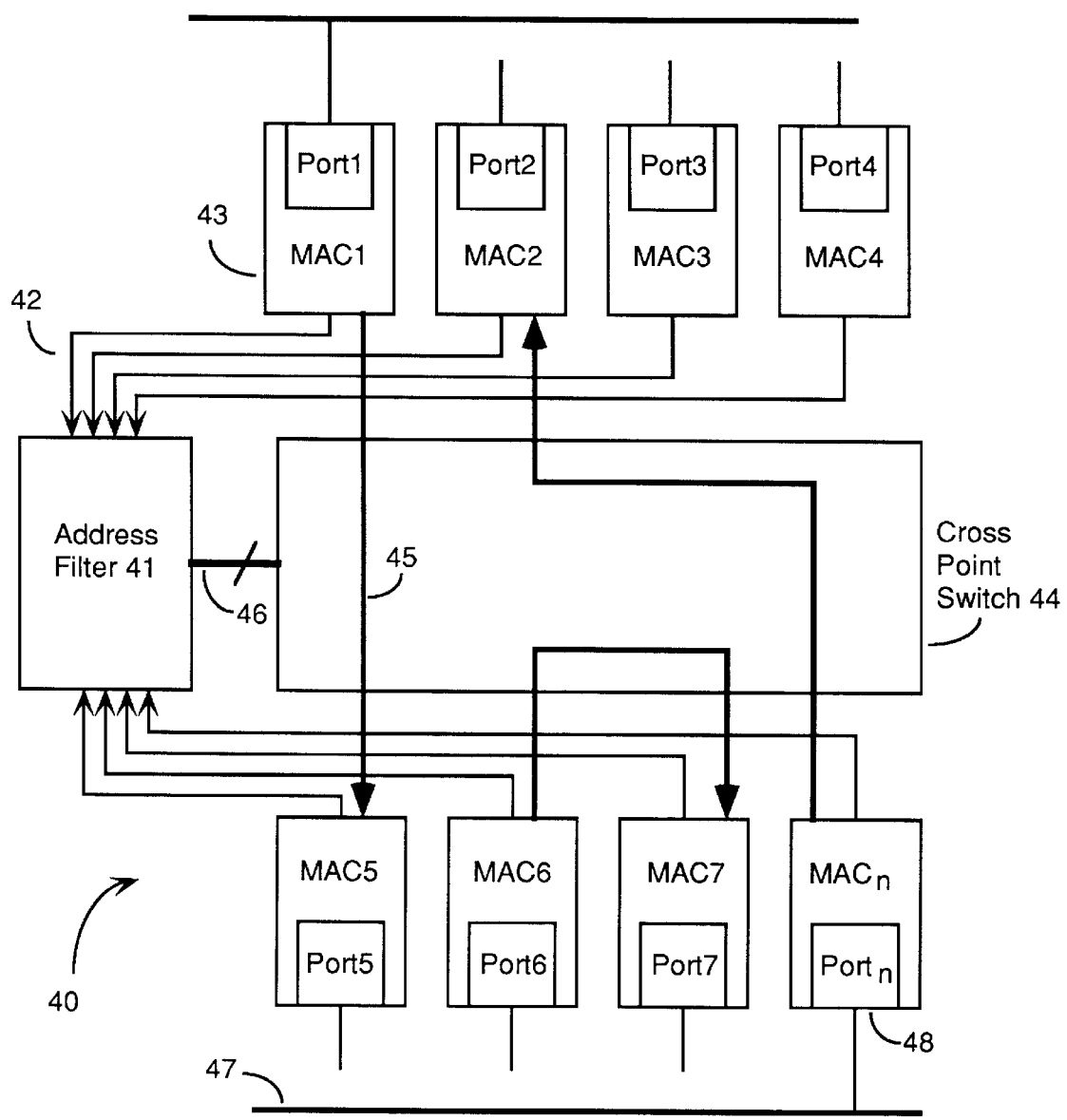
FIG. 3 is a block diagram of a prior art switching hub employing a cross point switch architecture.
Figure 14:
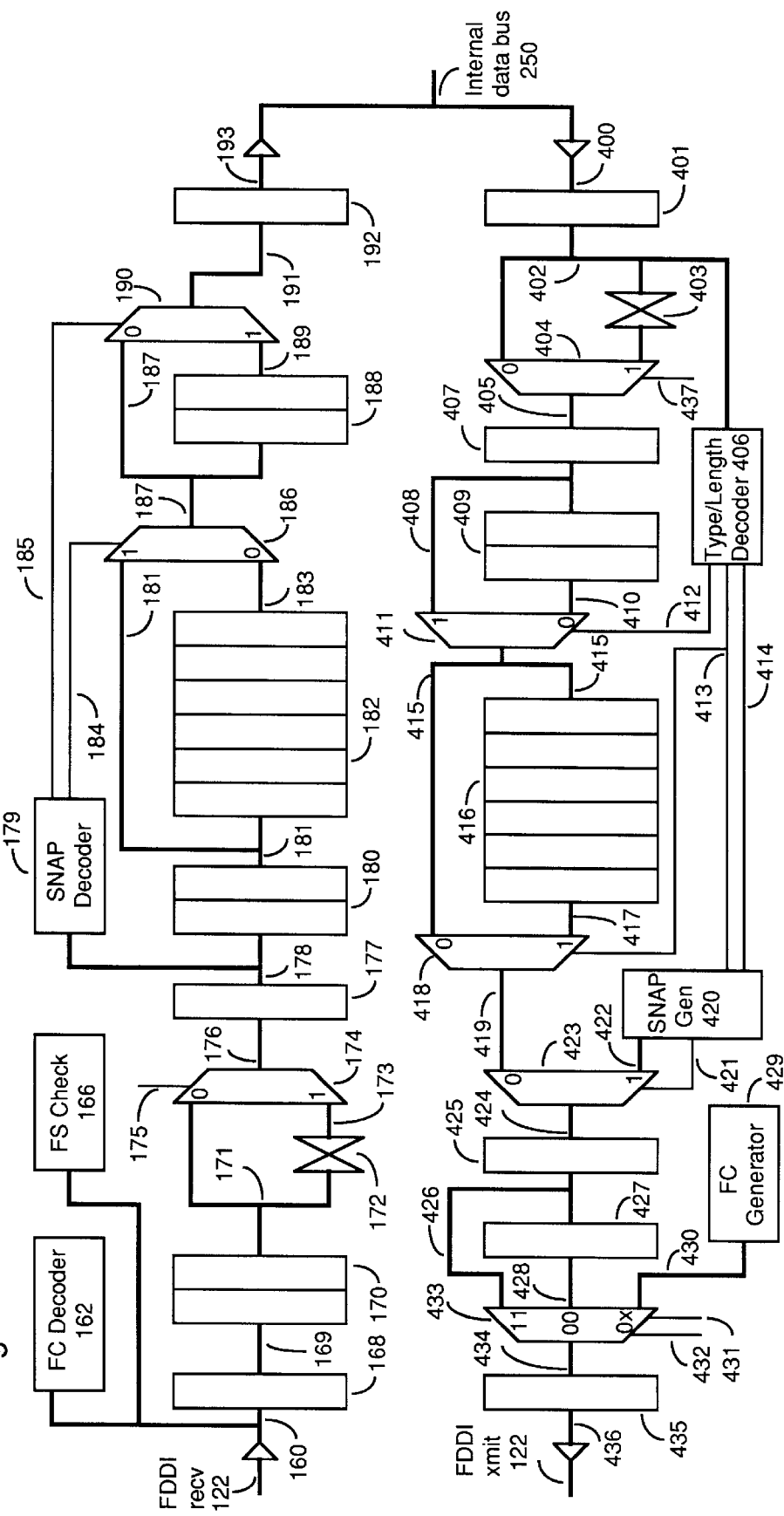
FIG. 14 is a detailed block diagram of an embodiment of the translation engine.

Referring to FIGS. 3 and 14, translation engine 130 comprises an array of one-byte registers, multiplexors and control logic coupled to form a synchronous dual path variable length data pipeline whose length varies depending upon the contents of the data stream. The synchronous circuit shifts the data stream through the series of registers on each clock pulse. As particular fields of a frame of data pass certain points in the pipeline, the manipulations described above take place. For example, as the three-byte 802.2 LLC field and three-byte SNAP OUI field of a 802.2 LLC/SNAP encapsulated frame are shifted into six-byte register array 182, SNAP decoder 179 detects the presence of a 802.2 LLC/SNAP encapsulated frame with a OUI of zero as it passes data path 178 and, recognizing the frame as a translated Ethernet frame, asserts select line 184, in effect causing multiplexor 186 to remove the 802.2 LLC and SNAP OUI fields currently in register array 182 from the data pipeline. The EtherType field of the SNAP header, currently held in two-byte register array 180, is then shifted on the next series of clock pulses over data path 181 and through multiplexor 186. As a result, the data stream placed on data path 187 is now six bytes shorter, but without introducing any space in the data stream.

As is well known to one of ordinary skill in the art, a multiplexor functions as a selector, selecting as its output only one of its data inputs according to the value of the control, or selector input. In the embodiment of translation engine 130 shown in FIG. 14, the length of the data pipeline varies depending on which input is selected by each of the multiplexors, due to the presence or absence of registers preceding a particular multiplexor input. Thus, translation engine 130 functions as a variable length data pipeline.

Referring to FIG. 14, translation engine 130 transmits a data stream on one of two separate unidirectional data paths depending on the direction of the data stream. When translating from FDDI frame format to IEEE 802.3 or Ethernet frame format, that is, when transmitting frames of data between a FDDI ring and a CSMA/CD LAN, translation engine 130 accepts an input data stream from the receive bus of FDDI bus extension 122 coupled to data path 160 and provides an output data stream at data path 193 coupled to data bus 250. When translating from IEEE 802.3 or Ethernet frame format to FDDI frame format, that is, when transmitting frames of data between a CSMA/CD LAN and a FDDI ring, translation engine 130 accepts an input data stream from data bus 250 coupled to data path 400 and provides an output data stream at data path 436 coupled to the transmit bus of FDDI bus extension 122. Because FDDI bus extension 122 is comprised of two unidirectional buses, translation engine 130 is capable of accepting a stream of data representing a frame of data at input data path 160 from the receive bus of FDDI bus extension 122 and beginning to shift the data stream through the variable length data pipeline to data bus 250 while at the same time transferring the tail end of a frame of data out output data path 436 to the transmit bus of FDDI bus extension 122. In an alternative embodiment that has two unidirectional buses on both sides of the variable length data pipeline, translation engine 130 is capable of full duplex operation, however, because distributed memory switching hub utilizes a single data bus 250, translation engine 130 effectively operates in a half duplex mode. The translation process as it relates to each unidirectional data path of the embodiment of translation engine 130 will now be described.

FDDI Ring to CSMA/CD LAN

The preamble, start of frame delimiter and frame control fields of a FDDI frame are received by translation engine 130 at input data path 160. They are shifted through the series of registers and multiplexors to output data path 193 coupled to data bus 250. Only after the fields are placed on data bus 250 does translation engine 130 assert a signal on the bus indicating data is ready to be transmitted onto it, thereby stripping the three fields already present on the bus. The frame check sequence (FCS), end delimiter and frame status fields are stripped in a similar, but opposite fashion. Prior to the fields being placed on data bus 250, translation engine 130 deasserts the data ready signal on data bus 250 indicating the end of data, thereby stripping the fields. This, of course, assumes that a frame is transferred. Frame control (FC) decoder 162 checks the contents of the one-byte frame control field of a frame as it is received over input data path 160 to determine what type of frame is to follow. Asynchronous LLC information frames of any priority using 48-bit MAC addresses (FC value 50(h) through 57(h)) are forwarded to data bus 250. However, FDDI station management (SMT) or MAC management frames (FC value C1(h) through CF(h)) are never forwarded to data bus 250. They are stripped by translation engine 130. Additionally, FDDI frames using 16-bit destination and source MAC address fields, as indicated by a frame address length field of zero, are never forwarded by translation engine 130 to data bus 250. Furthermore, synchronous LLC information frames and reserved frames are never forwarded to data bus 250.

The next two fields following the frame control field in a FDDI frame are the 48-bit destination and source MAC address fields. By convention, CSMA/CD LANs (Ethernet and IEEE 802.3 LANs) use canonical addressing. The data bus 250 also transmits the MAC address fields of a frame in canonical bit-order sequence. By doing so, each CSMA/CD LAN port 200 of FIG. 4 does not have to swap the bit-order sequence of each byte of the destination and source MAC address fields. Furthermore, CAM 300 of FIG. 4 is able to operate entirely using canonical addresses. FDDI, however, uses noncanonical addressing. It is, therefore, the responsibility of the translation engine 130 to reverse the bit-order sequence of each byte in the destination and source MAC address fields of any frame received from the FDDI network via the receive bus of FDDI bus extension 122 before transmitting the frame onto data bus 250. This function is performed by noncanonical to canonical bit flipper 172, multiplexor 174 and select line 175. Select line 175 is initially asserted so that multiplexor 174 accepts input from data path 173, which is coupled to the output of noncanonical to canonical bit flipper 172. Bit flipper 172 reverses the bit-order sequence of each byte of data it transmits. Select line 175 is deasserted upon reaching the end of the source MAC address field. Thus, all bits in the data stream, from the preamble indicating the beginning of a FDDI frame through the source address field are sequenced in canonical format. Since the preamble, start of frame delimiter and frame control fields are later stripped, in effect, only the destination and source address fields are sequenced in canonical bit order. Upon deassertion of select line 175, multiplexor 174 accepts input from data path 171, rather than data path 173, thereby bypassing bit flipper 172. Thus, all remaining bits in the data stream are transmitted over data path 176, through register 177, and over the remainder of the variable length data pipeline in their original noncanonical sequence until the preamble of another frame is detected.

SNAP decoder 179 next scans the eight bytes following the source MAC address field to determine whether a SNAP header is present, the value of the OUI field if a SNAP header is present, and the value of the EtherType field if a zero OUI is present. While SNAP decoder 179 scans and evaluates the eight bytes, six bytes representing what may be a three-byte 802.2 LLC field and a three-byte SNAP OUI field are shifted through register array 180, over data path 181 and into six-byte register array 182. The remaining two-bytes representing what may be a two-byte EtherType field are shifted into two-byte register array 180. Select line 184 is initially deasserted so that multiplexor 186 selects as its output input data path 183 coupled to register array 182. If SNAP decoder 179 determines the frame should be translated to Ethernet frame format, it asserts select line 184 so that multiplexor 186 selects as its output input data path 181, in effect causing multiplexor 186 to remove the 802.2 LLC and SNAP OUI fields currently in register array 182 from the data pipeline. At the same time, select line 185 is deasserted, so that selector 190 will not insert into the data pipeline the two bytes input from two-byte register array 188 representing the length field of an IEEE 802.3 frame. The EtherType field of the SNAP header, currently held in register array 180, is then shifted on the next series of clock pulses over data path 181, through multiplexor 186 and 190, bypassing register array 188, thereby preserving the value for the protocol type field of an Ethernet frame. If, on the other hand, SNAP decoder 179 determines the frame format should be maintained, select line 184 remains deasserted so that multiplexor 186 selects as its output input data path 183. The contents of register array 182 are shifted over data path 183, through multiplexor 186, and on to data path 187. At the same time, select line 185 is asserted, so that multiplexor 190 accepts input from data path 189, thereby inserting ahead of the 802.2 LLC header two bytes from register array 188 representing the length field of an IEEE 802.3 frame. In this manner, insertion of the IEEE 802.3 length field is accomplished without halting the synchronous flow of the data stream. Because the end delimiter has not been detected yet, the length of the frame of data is not known at this point. Thus, the length field contains garbage. It will be the responsibility of CSMA/CD LAN port 200 to calculate the proper length of the frame and replace the garbage value in the length field prior to transmitting the IEEE 802.3 frame onto the CSMA/CD LAN. Multiplexor 190 remains in the same state until the end of the data stream representing a frame of data is shifted through register 188. Were register 190 to otherwise switch back to accepting input from data path 181, the two bytes present in register 188 at the time of the switch would be effectively removed from the data stream, causing loss of data.

The FDDI frame check sequence (FCS), end delimiter and frame status fields are stripped as discussed above when the frame is transferred onto data bus 250. However, translation engine 130 will do frame validity checking. If a bad frame is detected, it will assert an abort signal on data bus 250 so that CSMA/CD LAN ports that have begun copying the frame will flush it. This is necessary because there is no buffering at FDDI MAC 123 of FIG. 5. By the time FDDI MAC 123 verifies the FCS of a LLC information frame it receives, the frame is already being transferred by translation engine 130 onto data bus 250.

A CSMA/CD LAN port 200, upon receiving the translated frame, will calculate the length of the frame in bytes and insert the value into the length field, and, in the case of IEEE 802.3, add a preamble and a start of frame delimiter. CSMA/CD LAN port 200 will further calculate and append a frame check sequence (FCS) before transmitting the frame onto its attached CSMA/CD LAN. If a frame is shorter than the minimum frame length allowed on a CSMA/CD LAN, CSMA/CD LAN port 200 will pad the frame. If the frame length is greater than that allowed on a CSMA/CD LAN, CSMA/CD LAN port 200 will discard the frame.

CSMA/CD LAN to FDDI Ring

The preamble field, and, in the case of an IEEE 802.3 frame, the start of frame delimiter (SFD) field of a frame received from a CSMA/CD LAN are discarded by CSMA/CD LAN port 200 to which the CSMA/CD LAN is coupled. Likewise, the frame check sequence is also stripped. The frame is then transferred to data bus 250. Thus, when translation engine 130 receives the frame at input data path 400, the first fields shifted through the series of registers and multiplexors to output data path 436 coupled to the transmit bus of FDDI bus extension 122 is the destination and source MAC address fields. By convention, a FDDI LAN uses noncanonical addressing. Data bus 250, however, transmits the MAC address fields of a frame in canonical bit-order sequence. Thus, the first step translation engine 130 needs to perform is to swap the bit-order sequence of each byte of the destination and source MAC address fields before transmitting the frame onto the transmit bus of FDDI bus extension 122. This function is performed by canonical to noncanonical bit flipper 403, multiplexor 404 and select line 437. Select line 437 is initially asserted so that multiplexor 404 accepts input from data path 438, which is coupled to the output of canonical to noncanonical bit flipper 403. Bit flipper 403 reverses the bit-order sequence of each byte of data it transmits. Select line 437 is deasserted upon reaching the end of the source MAC address field. Thus, only the destination and source MAC address fields are sequenced in noncanonical format. Upon deassertion of select line 437, multiplexor 404 accepts input from data path 402 rather than data path 438, thereby bypassing bit flipper 403. Thus, all remaining bits in the data stream are transmitted over data path 405, through register 407, and over the remainder of the variable length data pipeline in their original canonical sequence until the destination address of another frame is detected.

The two bytes following the source MAC address field are next shifted through the variable length data pipeline of translation engine 130. Type/length decoder 406 receives these two bytes over data path 402 and scans them to determine whether the frame is an Ethernet or IEEE 802.3 MAC frame. If the bytes contain a value less than or equal to 1500(d) (5DC(h)), a length field is deemed present and, thus, the frame is considered a IEEE 802.3 MAC frame. As FDDI frames do not have a length field, it needs to be discarded. While Type/length decoder 406 is determining the presence of a type or length field, the data stream continues to be shifted through the registers so that the two bytes following the source MAC address are now held by two-byte register array 409. Once Type/length decoder 406 determines a length field is, indeed, present, it asserts select line 412 so that multiplexor 411 selects as its input data path 408 rather than data path 410, thereby removing the length field held in register array 409. Select line 412 remains asserted so that the remainder of the frame bypasses register array 409 in its journey through the variable length data pipeline. In this way, the length field of a frame of data is deleted without causing any space or gap in the data stream. If, however, the two bytes following the source MAC address field contain a value greater than 1500(d), a protocol type field is deemed present, and thus, the frame is considered an Ethernet frame. In this case, select line 412, which is initially deasserted, remains deasserted by type/length decoder 406. The two bytes representing the protocol type field bypass register array 409 as they are shifted through multiplexor 411 to data path 415.

In addition to preserving the protocol type field of an Ethernet frame, type/length decoder 406, along with six-byte register array 416, multiplexor 418 and select line 413, cause a six-byte field to be inserted immediately after the source MAC address field of a frame. Initially, select line 413 is deasserted, so that the data stream follows data path 415 to multiplexor 418 as it passes through the variable length data pipeline. However, if type/length decoder 406 detects the presence of an Ethernet protocol type field, it asserts select line 413, causing multiplexor 418 to accept input from data path 417 and insert into the data stream the six uninitialized bytes held in register array 416. Initially the six bytes act as a placeholder, reserving room in the data stream for a three-byte 802.2 LLC header and three-byte SNAP OUI field. Correct values are added by SNAP generator 420 later in the variable length data pipeline. Upon reaching the end of a frame in the data stream, type/length decoder deasserts select line 413 so that multiplexor 418 again accepts input from data path 415. In this manner, the variable length data pipeline of translation engine 130 is able to insert a six-byte field representing the 802.2 LLC and SNAP header in order to preserve the protocol type field of an Ethernet frame without causing any back up in the continuous flow of the data stream through the data pipeline.

In a case where type/length decoder 406 detects the presence of a protocol type field and causes a six-byte field representing the 802.2 LLC and SNAP OUI fields to be inserted by multiplexor 418 into the data stream, it needs to further determine the upper layer protocol represented by the value of the protocol type field, so that the contents of the 802.2 LLC and SNAP OUI fields can be set to the correct value. If the value of the protocol type field indicates this is an AppleTalk Phase 1 ARP frame (08F3(h)), an 802.2 LLC/SNAP header needs to be inserted with a OUI of 00-00-F8(h) immediately following the source MAC address, preserving the value of the protocol type field in the SNAP EtherType field. If, on the other hand, the value of the protocol type field indicates a value other than AppleTalk Phase 1 ARP, an 802.2 LLC/SNAP needs to be inserted with a OUI of 00-00-00(h) immediately following the source MAC address, preserving the value of the protocol type field in the SNAP EtherType field in accordance with the recommended guidelines for translating Ethernet frame format to a frame format supported by IEEE 802.X and FDDI LANs. This feature of translation engine 130 is enabled via external control coupled to type/length decoder 406.

Setting the 802.2 LLC and SNAP OUI fields to their appropriate values is accomplished as follows. Select line 421 is initially deasserted so that multiplexor 423 transmits as output on data path 424 the IEEE 802.3/802.2 LLC frames it receives as input on data path 419. No SNAP extension need be inserted as the frames are not Ethernet frames. When type/length decoder 406 detects the presence of a protocol type field in the data stream, indicating the presence of an Ethernet frame, it asserts select line 413 which causes multiplexor 418 to insert six bytes into the data stream immediately following the source MAC address field so that the Ethernet frame can be translated to the appropriate frame format while at the same time preserving the protocol type field. Select line 413 is also coupled to SNAP generator 420. When select line 413 is asserted, SNAP generator 420 then asserts select line 421, coupled to multiplexor 423. Multiplexor 423 is now ready to transmit as output on data path 424 802.2 LLC/SNAP encapsulated frames with the correct DSAP, SSAP, and control values for the 802.2 LLC header and the correct SNAP OUI value. SNAP generator 420 provides the correct values via data path 422 coupled to multiplexor 423. After the source MAC address field of a frame is received over data path 419 and output by multiplexor 423 over data path 424, SNAP generator 420 asserts select line 421 and begins transmitting the proper values for the DSAP, SSAP and control fields within the three-byte 802.2 LLC header. Type/length decoder 406 asserts control line 414 when a protocol type of AppleTalk Phase 1 ARP has been decoded, so that SNAP generator 420 transmits a OUI of 00-00-F8(h) over data path 422. If type/length decoder 406 has decoded a protocol type other than AppleTalk Phase 1 ARP, control line 414, initially deasserted, remains deasserted, so that SNAP generator 420 transmits a OUI of 00-00-00(h) over data path 422. Multiplexor 423, in turn, transmits over data path 424 the 802.2 LLC and SNAP OUI fields generated by SNAP generator 420, thereby replacing the uninitialized values for the placeholder fields inserted earlier in the variable length data pipeline. After transmitting the 802.2 LLC and SNAP OUI fields, SNAP generator 420 deasserts select line 421, causing multiplexor 423 to again transmit as output over data path 424 input from data path 419.

Immediately prior to forwarding the destination MAC address of a frame over the transmit bus of FDDI bus extension 122 to FDDI MAC 123, translation engine 130 inserts a frame control (FC) field. The value of the FC field that is inserted is 57(h), indicating an asynchronous LLC information frame with default priority. Initially, select lines 431 and 432 are asserted so that multiplexor 433 accepts input of the data stream from data path 426, bypassing register 427 and data path 428. Just prior to a destination MAC address in the data stream, the select line 431 is deasserted so that a one-byte field, the uninitialized contents of register 427, is inserted in the data stream. Select line 432 is then also deasserted, so that multiplexor 433 accepts as input the value 57(h) generated by frame control (FC) generator 429 and transmitted over data path 430 coupled to multiplexor 433. Multiplexor 433 transmits this value over data path 434 before select lines 431 and 432 are reasserted, so the remaining data stream again bypasses register 427. The data stream continues to be shifted through the remainder of the variable length data pipeline until transmitted over output data path 436.

At this point, frame format translation is complete. While a frame is shifted through the variable length data pipeline of translation engine 130 to FDDI bus extension 122, preambles are being transmitted onto the transmit bus of FDDI bus extension by translation engine 130. FDDI MAC 123 adds a start of frame delimiter (SFD) field prior to the FC field, calculates and appends a frame check sequence (FCS) field after the information field, and adds an end delimiter and frame status field following the FCS field before placing the frame on the FDDI ring.

For IEEE 802.3 frames being forwarded to FDDI, translation engine 130 will forward only as many bytes of the frame as specified by the length field. In this way, any pad field needed to meet the minimum frame length for IEEE 802.3 frames will be removed. This step is not performed for Ethernet frames, since it is the responsibility of the upper layer protocol to maintain information regarding the length of the frame, and as, such, is off limits to a MAC layer device such as an embodiment of the present invention.

5. Operation of Address Filter Engine, CAM and Bus Arbiter

Address filter engine 280 is responsible for determining which CSMA/CD LAN port 200 or FDDI port is the destination LAN port for each frame transferred to data bus 250, and forwarding that frame accordingly. It does this by learning the source MAC addresses of end stations attached to CSMA/CD LAN segments coupled to each CSMA/CD LAN port 200 in a manner similar to a IEEE 802.1D standard MAC layer transparent bridge. Address filter engine 280 monitors the source MAC addresses learned on each CSMA/CD LAN port 200, removes MAC addresses from CAM 300 that are no longer in use, as when an end station is powered off or removed from a CSMA/CD LAN segment, and resolves problems created by duplicate MAC address conditions, network topology loops, or migration of an end station to which a MAC address is assigned from one CSMA/CD LAN segment to another.

Referring to FIG. 4, address filter 280 works in conjunction with content addressable memory (CAM) 300. In the embodiment shown therein, CAM 300 is a MU9C1480 LANCAM manufactured by Music Semiconductors, Campbell, Calif. The MU9C1480 LANCAM consists of 1024 64-bit content addressable memory entries. While distributed memory switching hub 18 is shown in FIG. 4 as having only one CAM 300, in the present embodiment, it can support up to four CAMs 300, providing the ability to support from 1024 to 4096 end stations coupled to CSMA/CD LAN ports 200. Each entry in CAM 300 consists of a 48-bit MAC address, stored in canonical bit-order sequence, a 4-bit LAN port number identifying the CSMA/CD LAN port 200 through which an end station to which that MAC address is assigned is coupled to distributed memory switching hub 18, and 12 "tag" bits. A "tag" bit, or simply, "tag" is a one bit field that represents a condition associated with the MAC address stored in the same entry, and is controlled by address filter engine 280. The tags discussed herein are the oscillation (OSC) tag, overwrite (OVWRT) tag, new (NEW) tag, hit (HIT) tag, static (STATIC) tag and block (BLOCK) tag.

The OSC tag, when set to one, indicates that there is a MAC address "oscillating" from a first CSMA/CD LAN port 200 to another CSMA/CD LAN port 200 and then back to the first CSMA/CD LAN port 200. Oscillation can be caused by duplicate MAC addresses on separate CSMA/CD LANs, or an improper loop in the network topology. The OSC tag bit is set by address filter engine 280 whenever a CAM entry with the OVWRT bit set is overwritten again.

The OVWRT tag, when set to one, indicates that a MAC address already present in a CAM entry (an "old MAC address") is now associated with a new CSMA/CD LAN port 200 number. This condition can occur when a network administrator physically moves an end station to which the MAC address is assigned to another CSMA/CD LAN segment. It can also occur due to a duplicate MAC address condition or improper loop in the network topology, in which case the OSC tag, as described above, will be set as well.

The NEW tag is set by address filter engine 280 whenever it creates a new entry in CAM 300 or overwrites an old entry, whereas the HIT tag is set by address filter engine 280 when a MAC address in an existing CAM entry has been observed in the source MAC address field of a frame of data within a finite interval of time known as the "aging" interval. Aging is primarily a mechanism for preventing CAM 300 from filling up with MAC addresses of end stations that no longer exist in the network. Software controlled by address filter engine 280 maintains an "aging timer" specifying an interval of time during which an entry in CAM 300 will be maintained whether or not the MAC address associated with the entry is seen in the source MAC address field of a frame transferred onto data bus 250. If the interval of time is exceeded before the MAC address associated with the entry is seen in the source MAC address field of a frame transferred onto data bus 250, as indicated by current value of the HIT tag, the CAM entry is aged out. The default aging interval is five (5) minutes, in accordance with the recommended default value set forth in transparent bridging standard IEEE 802.1 D, although the value may be changed. Setting the HIT tag means changing the value of the bit position representing the HIT tag depending on the current value of a HIT polarity. Each time the aging interval expires, the HIT polarity changes to the opposite polarity, from one to zero or zero to one. The HIT tag assists address filter engine 280 in aging out CAM entries that are no longer in use. If an entry in CAM 300 is not recognized, i.e., a HIT does not occur before the aging interval expires, the entry is "aged out", that is, it is no longer considered a reliable indicator that the MAC address and port number associated with the MAC address are still valid. If thereafter address filter engine 280 captures the same MAC address in the source MAC address field of a frame of data transferred onto data bus 250, a new entry will be created in CAM 300 for the MAC address, with its associated NEW tag set to one.

The STATIC tag identifies a CAM entry created by a network administrator, not by address filter engine 280. Such entries remain static, that is, they are not aged out after the expiration of a period of time equal to the aging interval. Finally, the BLOCK tag identifies a MAC address which, when observed in either the source or destination MAC address field of a frame of data transferred onto data bus 250, should cause distributed memory switching hub 18 to abort the frame.

Address filter engine 280, bus arbiter 252 and CAM 300 operate to provide address filtering capability in real time, that is, the destination LAN port number is identified before the frame of data from which the destination MAC address is read and compared to entries in CAM 300 is transferred from data bus 250. In other words, the destination LAN port to which a minimum length frame of data on data bus 250 is forwarded is determined between the time the destination MAC address of a frame is received by address filter 280 and the end of the frame is transferred from data bus 250. To that end, address filter engine 280 performs both filtering and learning, as described below.

When a frame of data is transferred across data bus 250, address filter 280 captures the destination and source MAC address fields of the frame. All CSMA/CD LAN ports 200 begin storing the frame in their respective VRAM 205 in first-in, first-out order, as described above, while the destination MAC address is written to a CAM register and compared against all valid entries stored in CAM 300. If a CAM entry is found that matches the MAC address in the CAM register then the correct destination CSMA/CD LAN port 200 number is read from the matching CAM entry and all other CSMA/CD LAN ports are signaled to flush the frame from their VRAM 205. If no match is found and the frame is not a multicast frame, then all CSMA/CD LAN ports are signaled to flush the frame, and it is only forwarded to FDDI MAC 123 for transmission on to the attached FDDI ring. If, however, no match is found and the frame is a multicast frame, then all CSMA/CD LAN ports 200 copy the frame into their respective VRAM 205. In any case, in the embodiment of the present invention shown in FIG. 4, all traffic originating on a CSMA/CD LAN segment will be transmitted on the FDDI ring coupled to FDDI A port 118 and B port 119. If the destination CSMA/CD LAN port 200 number associated with the destination MAC address of a frame is the same as the source CSMA/CD LAN port 200 from which the frame was received, the frame is aborted, thus preventing traffic that is local to a single CSMA/CD LAN segment from being transferred to the FDDI ring and consuming unnecessary bandwidth and distributed memory switching hub 18 system resources. Filtering, that is, the comparison of the destination MAC address of a frame against all entries in CAM 300 is completed within the first 20 bytes of the frame transferred onto data bus 250, thus achieving real time filtering.

Address filter engine 280 expects CAM 300 to maintain a list of all MAC addresses assigned to end stations coupled to CSMA/CD LAN segments which, in turn, are coupled to CSMA/CD LAN ports 200. When distributed memory switching hub 18 is powered up and initialized, CAM 300 is empty, there are no entries containing MAC addresses. Address filter engine 280 needs to learn and store the MAC addresses assigned to the end stations in CAM 300. Furthermore, over time, it is probable that end stations will be added or removed from LAN segments, or powered off for an extended period of time, or physically moved from one LAN segment to another. Address filter engine 280 needs to learn about the MAC addresses of these end stations as well if it is to correctly filter frames containing the MAC addresses. Thus, in addition to performing filtering, Address filter engine 280 performs learning. However, while filtering is based on the destination MAC address of a frame of data on data bus 250, learning is based on the source MAC address of a frame of data on data bus 250. Only MAC addresses of stations attached to CSMA/CD LAN ports 200 are learned. Learning, like filtering, is also performed real time; it is completed within the first 34 bytes of a frame transferred onto data bus 250.

With respect to the learning process, the source MAC address of a frame transferred onto data bus 250 is written by address filter engine 280 to a CAM register and compared against all valid CAM entries. If no match is found then a new CAM entry is created that includes the 48-bit source MAC address and the source CSMA/CD LAN port 200 number. The NEW and HIT tags are set for the new entry. The NEW tag allows address filter 280 to keep a current list of all MAC addresses in CAM 300 by periodically searching for new entries, reading them, and subsequently clearing the NEW tag. If, however, a source MAC address of a frame transferred onto data bus 250 is found to match an entry in CAM 300, then the CSMA/CD port 200 number stored in the matching entry is compared to the source CSMA/CD LAN port 200 from which the frame was received. If the port numbers do not match, then the CAM entry is overwritten with the NEW, OVWRT and HIT tags set, indicating that while the MAC address is not new (OVWRT), the CSMA/CD LAN port 200 number associated with it is new (NEW). If, on the other hand, the CSMA/CD LAN port 200 number associated with the source MAC address matches the port number maintained in the CAM entry, only the HIT tag is set.

CAM entries which are learned by address filter engine 280, as opposed to static entries entered by a network administrator, can be aged out. As such, they are referred to as dynamic entries. In some circumstances it is convenient for a network administrator, via software controlled by address filter engine 280, to be able to create static CAM entries (in which the STATIC tag is set) that are not aged out. This is useful for resolving duplicate MAC address and network topology loop conditions, as well as for restricting the movement of end stations from one CSMA/CD LAN segment to another, or the forwarding of multicast frames.

Address filter engine 280 manages CAM 300 via a set of software commands. These address filter engine 280 software commands, or simply, address filter commands, allow software to control CAM entries without disabling address filter engine 280. The address filter commands cannot be used to access CAM 300 directly while address filter engine 280 is enabled because CAM 300 needs to be in a specific state for the filtering and learning processes to operate correctly. All accesses to CAM 300 will change that state. The address filter commands atomically execute a series of CAM 300 accesses that perform the specified operation and return CAM 300 to its initial state. The longest address filter commands take 34 byte times to execute. If a short frame of data is transferred onto data bus 250 and transfer of the frame is completed before completion of a address filter command, the frame will be forwarded to all LAN ports. Address filter commands allow software to search CAM 300 for new or modified entries, create CAM entries, age out obsolete entries, and perform general purpose CAM searches, for example, find all entries associated with a particular CSMA/CD LAN port 200, or all static entries, etc.

Figure 15:
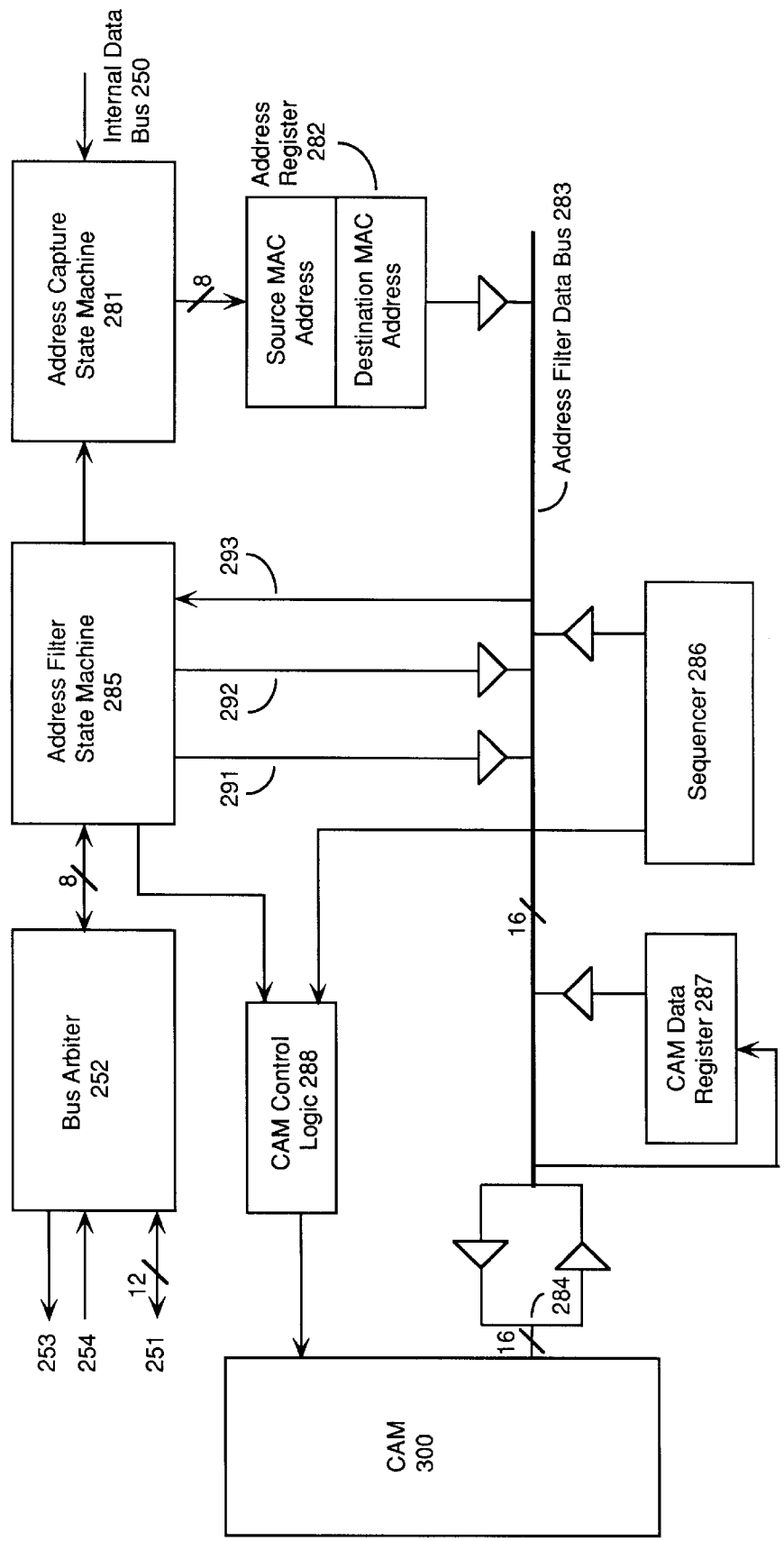
FIG. 15 is a block diagram comprising an address filter engine, bus arbiter and content addressable memory of an embodiment of the present invention.

Referring to FIG. 15, an embodiment of address filter engine 280, bus arbiter 252 and CAM 300 is shown. Address capture state machine 281 captures a data stream representing the source and destination address of each frame of data transferred onto data bus 250 coupled thereto. The addresses are buffered in source and destination MAC registers, collectively referred to as address register 282. The addresses are then forwarded from address register 282 to address filter data bus 283 operating at 12.5 Mbytes per second, which in turn forwards the addresses over external CAM data bus 284 to separate registers located within CAM 300 (not shown in FIG. 15). Address filter state machine 285 controls the movement of the source and destination MAC addresses from data bus 250 to CAM 300. Address filter state machine 285 further controls CAM 300 by way of a set of software commands communicated to CAM 300 over command line 291 coupled between address filter state machine 285 and address filter data bus 283. Tag fields are set via write tag control line 292 and the values of tag fields are read via read tag control line 293. Sequencer 286 couples network management core 100 shown in FIG. 4 with address filter data bus 283 so as to allow network management core 100 access to entries within CAM 300.

Bus arbiter 252, coupled in communication with address filter state machine 285, is further coupled to translation engine 130 via unidirectional control lines 253 and 254 (Shown also in FIG. 4). In the embodiment shown in FIGS. 4 and 15, when a CSMA/CD LAN port 200 requests mastership of data bus 250 from bus arbiter 252 via its control line 251, bus arbiter 252 notifies translation engine 130 via control line 253. As described earlier, translation engine 130 instructs FDDI MAC 123 to obtain a FDDI token. Once translation engine 130 has been notified by FDDI MAC 123 that a token has been obtained, it informs bus arbiter 252 via control line 254. Finally, bus arbiter 252 grants CSMA/CD LAN port 200 access to data bus 250 by signaling the port via control line 251.

Bus arbiter 252 further controls CSMA/CD LAN ports 200 as to whether they will complete the copy of a frame of data from data bus 250 to their respective VRAM 205. The guidelines under which bus arbiter 252 operates are as follows. Bus arbiter 252 will grant permission via control line 251 to a CSMA/CD LAN port 200 to transfer data onto data bus 250 when the bus is idle, i.e., no data is present on the bus. Bus arbiter 252 will also assert control line 251 when there is a frame of data on data bus 250 to indicate to a CSMA/CD LAN port 200 to stop copying the frame of data from the bus and flush the frame from its VRAM 205. If, on the other hand, control line 251 is not asserted and a frame of data is present on data bus 250, CSMA/CD LAN port 200 copies a frame of data from the bus. Thus, bus arbiter 252, address filter engine 280 and CAM 300 work in conjunction to autonomously forward frames of data to the correct destination CSMA/CD LAN ports 200 of distributed memory switching hub 18 in real time.

Thus, a method and apparatus has been described for interconnecting heterogeneous local area networks operating at different speeds and for receiving, storing and forwarding frames of data between the local area networks (LANs), particularly for an apparatus in which memory storage is distributed among the low speed LAN ports to which the low speed LANs are attached.

We claim:

1. A memory storage device coupled to a high speed data bus and a single low speed data bus for storing and bidirectionally transferring frames of data between said high speed data bus and said low speed data bus, said memory storage device comprising:
    a serial access memory, hereafter referred to as SAM, coupled to said high speed data bus for high speed bidirectional data transfer of said frames of data with said high speed data bus; and
    a dynamic random access memory, hereafter referred to as RAM, coupled to said low speed data bus for low speed bidirectional data transfer of said frames of data with said low speed data bus, said SAM and said RAM coupled to provide bidirectional transfer of said frames of data between said SAM and said RAM.

2. A memory storage device coupled to a first data network operating at a high data transmission speed and a second data network operating at a low data transmission speed for storing and bidirectionally transferring data between said first data network and said second data network, said memory storage device comprising:
    a serial access memory, hereafter referred to as SAM, coupled to said first data network for bidirectional transfer of said data with said first data network at said high data transmission speed;
    a dynamic random access memory, hereafter referred to as RAM, coupled to said second data network for bidirectional transfer of said data with said second data network at said low data transmission speed; and
    said SAM coupled to said RAM for bidirectional transfer of said data therebetween.

3. The memory storage device of claim 2, wherein said first data network is a local area network.

4. The memory storage device of claim 3, wherein said local area network is a fiber distributed data interface ring.

5. The memory storage device of claim 2, wherein said second data network is a local area network.

6. The memory storage device of claim 5, wherein said local area network is a local area network employing a carrier sense, multiple access bus with collision detection to transmit said data.

7. A memory storage device coupled to a first data network operating at a high data transmission speed and a second data network operating at a low data transmission speed for storing and bidirectionally transferring data between said first data network and said second data network, said memory storage device comprising:
    a serial access memory, hereafter referred to as SAM, coupled to said first data network for bidirectional transfer of said data with said first data network at said high data transmission speed;
    a dynamic random access memory, hereafter referred to as RAM, coupled to said second data network for bidirectional transfer of said data with said second data network at said low data transmission speed; and
    said SAM coupled to said RAM to provide bidirectional transfer of said data therebetween.

8. An apparatus for bidirectionally exchanging data between a high speed local area network, hereafter referred to as high speed LAN, and a plurality of low speed local area networks, hereafter referred to as low speed LANs, said apparatus comprising:
    a high speed internal data bus;
    a high speed LAN port coupling said high speed LAN to said high speed internal data bus for transferring said data between said high speed LAN and said high speed internal data bus; and,
    a plurality of low speed LAN ports, each coupling one of said low speed LANs to said high speed internal data bus for transferring said data between one of said low speed LANs and said high speed internal data bus, and each having a memory storing said data to be transferred between one of said low speed LANs and said high speed internal data bus, said memory comprising:
        a serial access memory, hereafter referred to as SAM, coupled to said high speed internal data bus for high speed bidirectional data transfer of said data with said high speed internal data bus; and
        a dynamic random access memory, hereafter referred to as RAM, coupled to one of said low speed LANs for low speed data bidirectional transfer of said data with one of said low speed LANS, said SAM and said RAM coupled to provide bidirectional transfer of said data between said SAM and said RAM.

9. An apparatus interconnecting a first local area network, hereafter referred to as first LAN, operating at a high data transmission speed, and a plurality of second local area networks, hereafter referred to as second LANs, operating at a low data transmission speed, for bidirectional communication of data among said first LAN and said second LANs, said apparatus comprising:
    a data bus operating at said high data transmission speed;
    a first port coupling said first LAN to said data bus;
    a plurality of second ports, each coupling one of said second LANs to said data bus; and
    a memory architecture, wherein memory is distributed among said second ports for storing and bidirectionally transferring said data between said data bus and said second LANs, said memory comprising:
        a serial access memory, hereafter referred to as SAM, coupled to said data bus for bidirectional transfer of said data with said data bus at said high data transmission speed;
        a dynamic random access memory, hereafter referred to as RAM, coupled to one of said second LANs for bidirectional transfer of said data with said second LAN at said low data transmission speed; and said SAM coupled to said RAM to provide bidirectional transfer of said data therebetween.

10. An apparatus for bidirectionally exchanging data between a high speed local area network, hereafter referred to as high speed LAN, and a plurality of low speed local area networks, hereafter referred to as low speed LANs, said apparatus comprising:

a high speed internal data bus capable of operating at a data transmission speed equal to said high speed LAN;

a high speed LAN port coupling said high speed LAN to said high speed internal data bus for transferring said data between said high speed LAN and said high speed internal data bus; and a plurality of low speed LAN ports, each coupling one of said low speed LANs to said high speed internal data bus for bidirectionally transferring said data between one of said low speed LANs and said high speed internal data bus, each of said low speed LAN ports having adaptation circuitry for matching data transmission speeds of one of said low speed LANs and said high speed internal data bus.

11. The apparatus of claim 10, wherein said adaptation circuitry is a memory storage device storing data to be transferred between one of said low speed LANs and said high speed internal data bus.

12. The apparatus of claim 11, wherein said memory storage device includes:

a high speed serial access memory, hereafter referred to as high speed SAM, coupled to and operating at a data transmission speed equal to said high speed internal data bus; and, a low speed dynamic random access memory, hereafter referred to as low speed RAM, coupled to and operating at a data transmission speed equal to said low speed LANs, said SAM and said RAM providing bidirectional transfer of said data between said SAM and said RAM.

* * * * *

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 1, line 39, change "to an" to --to--;

In column 1, lines 56, 57, change '"end stations"' to --"end stations,"--;

In column 2, line 52, change "a FDDI" to --an FDDI--;

In column 2, line 52, change "station s" to --stations--;

In column 2, line 55, after "time" delete the comma;

In column 2, line 59, change "a FDDI" to --an FDDI--;

In column 2, line 66, change "a FDDI" to --an FDDI--;

In column 3, line 9, change "a FDDI" to --an FDDI--;

In column 3, line 51, change "speeds, and" to --speeds and,--;

In column 3, line 53, change "a FDDI" to --an FDDI--;

In column 4, line 54, after "or" insert --to--;

In column 5, line 1, delete "that";

In column 5, lines 16, 17, change "all or nothing" to --all-or-nothing--;

In column 5, line 60, change "Address" to --address--;

In column 6, line 1, change "port, and" to --port and,--;

In column 6, line 8, change "can not" to --cannot--;

In column 6, line 64, change "on to" to --onto--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 9, line 49, after "device" insert --,--;

In column 9, line 49, after "hub" insert --,--;

In column 9, line 51, change "need" to --needs--;

In column 10, line 2, after "header" insert --,--;

In column 10, line 3, after "header" insert --,--;

In column 10, line 39, a change "a FDDI" to --an FDDI--;

In column 12, line 55, change "a FDDI" to --an FDDI--;

In column 12, line 56, change "A FDDI" to --An FDDI--;

In column 13, line 11, change "second, thus" to --second. Thus--;

In column 13, line 12, change "a" and --an--;

In column 13, line 22, after "105" insert --,--;

In column 13, line 23, after "250" insert --,--;

In column 13, line 38, change "252, or" to --252 or,--;

In column 14, line 13, change "a FDDI" to --an FDDI--;

In column 14, line 13, change "a FDDI" to --an FDDI--;

In column 14, line 30, change "a FDDI" to --an FDDI--;

In column 14, line 33, change "a FDDI" to --an FDDI--;

In column 14, line 55, after "embodiment" delete the comma;

UNITED STATES PATENT AND TRADEMARK OFFICE
CERTIFICATE OF CORRECTION

PATENT NO. : 5,812,792
DATED : September 22, 1998
INVENTOR(S) :
Stephen R. Haddock et al.

It is certified that error appears in the above-identified patent and that said Letters Patent is hereby corrected as shown below:

In column 14, line 62, change "a FDDI" to --an FDDI--;

In column 15, line 45, change "from or to be transmitted to a" to --from, or to be transmitted to, a--;

In column 16, line 13, after "200" insert --,--;

In column 16, line 49, change "control" to --controls--;

In column 17, line 19, change "a FDDI" to --an FDDI--;

In column 17, line 38, change "a MSM518122-JS/JZ" to --an MSM518122-JS/JZ--;

In column 18, line 50, change "modes, thus" to --modes. Thus,--;

In column 19, line 12, change "Specifically" to --Specifically,--;

In column 19, line 14, change "speeds" to --speeds,--;

In column 19, line 23, change "a FDDI" to --an FDDI--;

In column 19, line 25, after "from" insert --,--;

In column 19, line 25, after "to" insert --,--;

In column 19, line 28, change "250, which" to --250 which,--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 19, line 29, change "130, and ultimately" to --130 and, ultimately, an--;

In column 19, line 41, after "to" insert --,--;

In column 19, line 41, after "from" insert --,--;

In column 19, line 43, change "201, which" to --201 which,--;

In column 19, line 55, after "266" insert --,--;

In column 19, line 55, after "FIG. 6" insert --,--;

In column 19, line 59, after "265" insert --,--;

In column 19, line 60, after "FIG. 6" insert --,--;

In column 20, line 48, after "opposite" insert --,--;

In column 22, line 45, after "invention", insert --,--;

In column 22, line 46, after "7" insert --,--;

In column 23, line 20, after "that" insert --,--;

In column 23, line 26, change "67" to --Sixty-seven--;

In column 24, line 34, change "from of" to --from--;

In column 24, line 42, after "frames" insert --,--;

In column 24, line 43, after "233" insert --,--;

In column 24, line 66, after "formats" insert --,--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 25, line 53, change "field, and" to --field and,--;

In column 25, line 56, change "field, and" to --field and,--;

In column 26, line 8, after "device" insert --,--;

In column 26, line 9, after "invention" insert --,--;

In column 26, line 11, change "a FDDI" to --an FDDI--;

In column 26, line 13, change "a FDDI" to --an FDDI--;

In column 26, line 18, change "a FDDI" to --an FDDI--;

In column 26, line 22, change "a FDDI" to --an FDDI--;

In column 26, line 28, after "device" insert --,--;

In column 26, line 29, after "invention" insert --,--;

In column 26, line 41, change the first "a" to --an--;

In column 26, line 42, change the second "a" to --an--;

In column 26, line 47, change "vise" to --vice--;

In column 26, line 52, change "a FDDI" to --an FDDI--;

In column 26, line 64, after "144" insert --,--;

In column 26, line 67, after "than" insert --,--;

In column 26, line 67 after "to" insert --,--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 27, line 8, change "a FDDI" to --an FDDI--.

In column 27, line 16, change "a FDDI" to --an FDDI--.

In column 27, line 21, change "a FDDI" to --an FDDI--.

In column 27, line 53, change "a FDDI" to --an FDDI--.

In column 27, lines 53, 54, change "translating" to --translation of--;

In column 27, line 54, change "a FDDI" to --an FDDI--.

In column 27, line 55, change "a FDDI" to --an FDDI--.

In column 27, line 59, after "LANs" insert --,--;

In column 28, line 7, after "AA(h)" insert --,--;

In column 28, line 12, change "frame, and" to --frame and,--;

In column 28, line 22, change "are typically" to --are, typically,--;

In column 28, line 26, change "a FDDI" to --an FDDI--.

In column 28, line 28, change "a OUI" to --an OUI--;

In column 28, line 32, change "a OUI" to --an OUI--;

In column 28, lines 34, 35, change "a OUI" to --an OUI--;

In column 28, line 36, change "a FDDI" to --an FDDI--;

In column 28, line 37 change "a OUI" to --an OUI--;

In column 28, line 42, after "device" insert --,--;

In column 28, line 42, after "invention" insert --,--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 28, line 47, change "a OUI" to --an OUI--;

In column 28, line 50, change "a OUI" to --an OUI--;

In column 28, line 54, change "a OUI" to --an OUI--;

In column 28, line 57, change "a OUI" to --an OUI--;

In column 28, line 60, change "a OUI" to --an OUI--;

In column 29, line 5, change "a OUI" to --an OUI--;

In column 29, line 14, change "a FDDI" to --an FDDI--;

In column 29, line 19, change "a OUI" to --an OUI--;

In column 29, line 43, change "a OUI" to --an OUI--;

In column 29, line 46, after "frame" insert --,--;

In column 29, line 47, change "a OUI" to --an OUI--;

In column 29, line 48, after "00-00(h)" insert --,--;

In column 30, line 24, change "a FDDI" to --an FDDI--;

In column 30, line 25, change "a OUI" to --an OUI--;

In column 30, lines 27, 28, change "a OUI" to --an OUI--;

In column 30, line 31, change "a OUI" to --an OUI--;

In column 31, line 23, change "a OUI" to --an OUI--;

In column 31, line 44, after "paths" insert --,--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 31, line 48, change "a FDDI" to --an FDDI--;

In column 31, line 54, change "a FDDI" to --an FDDI--;

In column 32, line 11, change "a FDDI" to --an FDDI--;

In column 32, line 19, after "opposite" insert --,--;

In column 32, lines 38, 39, change "a FDDI" to --an FDDI--;

In column 32, line 62, change "a FDDI" to --an FDDI--;

In column 32, line 63, after "field" insert --,--;

In column 33, line 15, after "181" insert --,--;

In column 33, line 65, change "a LLC" to --an LLC--;

In column 34, line 14, after "field" delete the comma;

In column 34, line 23, change "is" to --are--;

In column 34, line 24, change "a FDDI" to --an FDDI--;

In column 34, line 55, change "a IEEE" to --an IEEE--;

In column 34, line 56, change "it needs" to --they need--;

In column 35, line 5, change "present, and" to --present and,--;

In column 35, line 22, after "Initially" insert --,--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 35, line 27, after "decoder" insert --406--;

In column 35, line 44, change "a OUI" to --an OUI--;

In column 35, line 50, change "a OUI" to --an OUI--;

In column 36, line 19, change "a OUI" to --an OUI--;

In column 36, line 23, change "a OUI" to --an OUI--;

In column 37, line 3, change "frame, and" to --frame and,--

In column 37, line 40, change 'or simply, "tag"' to --or, simply "tag",--;

In column 37, line 42, after "entry" delete the comma;

In column 38, line 29, after "If" insert --,--;

In column 38, line 29, after "thereafter" insert --,--;

In column 39, line 2, change "on to" to --onto--;

In column 39, line 6, after "invention" insert --,--;

In column 39, line 17, after "300" insert --,--;

In column 39, line 25, after "empty" delete the comma and insert --and--;

In column 39, line 33, after "well", insert --,--;

In column 39, line 34, change "Address" to --address--;

UNITED STATES PATENT AND TRADEMARK OFFICE
CERTIFICATE OF CORRECTION

PATENT NO. : 5,812,792
DATED : September 22, 1998
INVENTOR(S) : Stephen R. Haddock et al.

It is certified that error appears in the above-identified patent and that said Letters Patent is hereby corrected as shown below:

In column 40, line 12, change "commands, or" to --commands or,--;

In column 40, line 51, after "100" insert --,--;

In column 40, line 51, after "4" insert --,--;

In column 40, line 52, after "283" insert --,--;

In column 40, line 57, "change "Shown" to --shown--;

In column 40, line 62, change "a FDDI" to --an FDDI--.

Signed and Sealed this

Second Day of November, 1999

Q. TODD DICKINSON

Attest:

Attesting Officer

Acting Commissioner of Patents and Trademarks